United States Patent
Xu et al.

(10) Patent No.: US 9,769,817 B2
(45) Date of Patent: Sep. 19, 2017

(54) LINKED NARROWBAND OPERATION FOR MTC

(71) Applicant: QUALCOMM Incorporated, San Diego, CA (US)

(72) Inventors: Hao Xu, San Diego, CA (US); Durga Prasad Malladi, San Diego, CA (US); Yongbin Wei, La Jolla, CA (US); Peter Gaal, San Diego, CA (US); Wanshi Chen, San Diego, CA (US); Madhavan Srinivasan Vajapeyam, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 14/818,824

(22) Filed: Aug. 5, 2015

(65) Prior Publication Data

US 2016/0044642 A1 Feb. 11, 2016

Related U.S. Application Data

(60) Provisional application No. 62/034,104, filed on Aug. 6, 2014.

(51) Int. Cl.
*H04W 72/04* (2009.01)
*H04W 4/00* (2009.01)
(Continued)

(52) U.S. Cl.
CPC ......... *H04W 72/042* (2013.01); *H04L 5/0096* (2013.01); *H04W 4/005* (2013.01); *H04W 74/0833* (2013.01); *H04W 72/1289* (2013.01)

(58) Field of Classification Search
CPC ............... H04W 72/042; H04W 4/005; H04W 74/0833
(Continued)

(56) References Cited

U.S. PATENT DOCUMENTS

2012/0195283 A1* 8/2012 Kwon ..................... H04L 5/001
370/329
2013/0077582 A1* 3/2013 Kim ..................... H04W 74/006
370/329
(Continued)

FOREIGN PATENT DOCUMENTS

WO WO-2014000309 A1 1/2014

OTHER PUBLICATIONS

Interdigital Communication Corporation, "Group Based RAB & IP Assignment for TS 22.368," 3GPP TSG-SA1 #49, S1-100140, San Francisco, USA, Feb. 22-26, 2010, 2 pgs., 3rd Generation Partnership Project.
(Continued)

*Primary Examiner* — Ronald B Abelson
(74) *Attorney, Agent, or Firm* — Holland & Hart LLP/Qualcomm

(57) ABSTRACT

Methods, systems, and devices are described for wireless communication at a UE. A user equipment (UE) may receive a control signal from a base station on resources of a first narrowband region. The UE may then identify a second narrowband region based on the control signal. In some cases a broadband carrier may be divided into an indexed set of narrowband regions, and the UE may identify an index using information contained in (implicitly or explicitly) in the control signal. The UE may communicate with the base station on resources of the second narrowband region. For example, a UE may receive a system information block (SIB) or a paging message, and perform a random access procedure using narrowband resources selected based on the SIB or paging message.

28 Claims, 20 Drawing Sheets

(51) Int. Cl.
*H04W 74/08* (2009.01)
*H04L 5/00* (2006.01)
*H04W 72/12* (2009.01)

(58) Field of Classification Search
USPC .................................................. 370/328, 329
See application file for complete search history.

(56) References Cited

U.S. PATENT DOCUMENTS

2013/0100900 A1    4/2013  Lee et al.
2013/0109391 A1*   5/2013  Lee ...................... H04W 48/12
                                                    455/436

OTHER PUBLICATIONS

ISA/EPO, International Search Report and Written Opinion of the International Searching Authority, Int'l Appl. No. PCT/US2015/043950, Oct. 20, 2015, European Patent Office, Rijswijk, NL, 12 pgs.
LG Electronics Inc., "Impacts Due to Narrow Bandwidth Characteristic of Low Cost MT CUE," 3GPP TSG-RAN2 Meeting #84, R2-134371, San Francisco, USA, Nov. 11-15, 2013, 4 pgs., 3rd Generation Partnership Project.
ZTE, "SIB Coverage Improvement for MTC UEs," 3GPP TSG RAN WG1 Meeting #76, R1-140281, Prague Czech Republic, Feb. 10-14, 2014, 5 pgs., 3rd Generation Partnership Project.

* cited by examiner

LINKED NARROWBAND OPERATION FOR MTC

CROSS REFERENCES

The present application for patent claims priority to U.S. Provisional Patent Application No. 62/034,104 by Xu et al., entitled "Linked Narrowband Operation for MTC," filed Aug. 6, 2014, assigned to the assignee hereof, and expressly incorporated by reference herein.

BACKGROUND

Field of the Disclosure

The following relates generally to wireless communication, and more specifically to linked narrowband operation for machine type communication (MTC).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system).

By way of example, a wireless multiple-access communications system may include a number of base stations, each simultaneously supporting communication for multiple communication devices, which may be otherwise known as user equipments (UEs). A base station may communicate with UEs on downlink channels (e.g., for transmissions from a base station to a UE) and uplink channels (e.g., for transmissions from a UE to a base station).

Some types of wireless devices may provide for automated communication. Automated wireless devices may include those implementing Machine-to-Machine (M2M) communication or machine type communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application.

In some cases, communicating over a broad frequency range may consume a large amount of power relative to the capabilities of an MTC device. That is, MTC devices may be small, low cost, or low complexity devices. Furthermore, MTC devices may be designed to operate on battery power for a long period of time relative to other UEs on a wireless network. Therefore, continuous broadband operation may hinder the successful operation of some MTC devices or reduce the usability of the wireless network for some applications.

SUMMARY

The present disclosure relates generally to wireless communication systems, and more particularly to systems, methods, and apparatuses for linked narrowband operation for machine type communication (MTC). A user equipment (UE) may receive a control signal from a base station on resources of a first narrowband region. The UE may then identify a second narrowband region based on the control signal. In some cases, a broadband carrier may be divided into an indexed set of narrowband regions, and the UE may identify an index using information contained (implicitly or explicitly) in the control signal. The UE may communicate with the base station on resources of the second narrowband region. For example, a UE may receive a system information block (SIB) or a paging message, and perform a random access procedure using narrowband resources selected based on the SIB or paging message.

A method of linked narrowband operation for MTC is described. The method may include receiving a control signal from a base station on resources of a first narrowband region, identifying a second narrowband region based at least in part on the control signal, and communicating with the base station on resources of the second narrowband region.

An apparatus for linked narrowband operation for MTC is described. The apparatus may include means for receiving a control signal from a base station on resources of a first narrowband region, means for identifying a second narrowband region based at least in part on the control signal, and means for communicating with the base station on resources of the second narrowband region.

A further apparatus for linked narrowband operation for MTC is described. The apparatus may include a processor, memory in electronic communication with the processor, and instructions stored in the memory. The instructions may be executable by the processor to receive a control signal from a base station on resources of a first narrowband region, identify a second narrowband region based at least in part on the control signal, and communicate with the base station on resources of the second narrowband region.

A non-transitory computer-readable medium storing code for linked narrowband operation for MTC is also described. The code may include instructions executable by a processor to receive a control signal from a base station on resources of a first narrowband region, identify a second narrowband region based at least in part on the control signal, and communicate with the base station on resources of the second narrowband region.

Some examples of the method, apparatuses, or non-transitory computer-readable medium described above may further include features of, means for, or processor-executable instructions for determining the second narrowband region from an explicit indication in the control signal. Some examples may include determining a set of available configurations of narrowband regions based on the control signal, and selecting the second narrowband region based on the set of available configurations.

Some examples of the method, apparatuses, or non-transitory computer-readable medium described above may further include features of, means for, or processor-executable instructions for determining the second narrowband region according to a configuration known a priori to the UE. In some examples, communicating comprises transmitting a random access channel (RACH) preamble.

Some examples of the method, apparatuses, or non-transitory computer-readable medium described above may further include features of, means for, or processor-executable instructions for identifying a third narrowband region linked to the second narrowband region, and receiving a RACH response message from the base station on resources of the third narrowband region. In some examples, communicating comprises transmitting a connection request on resources of the second narrowband region.

Some examples of the method, apparatuses, or non-transitory computer-readable medium described above may further include features of, means for, or processor-executable instructions for identifying a third narrowband region linked to the second narrowband region, and receiving a connection setup message on resources of the third narrowband region. In some examples, the first control signal comprises a synchronization signal, a physical broadcast channel (PBCH) transmission, a paging message, or a system information block (SIB).

In some examples of the method, apparatuses, or non-transitory computer-readable medium described above the control signal includes a paging message, and the communicating includes transmitting a RACH preamble on the resources of the second narrowband region. Some examples may include receiving a paging message on resources of a third narrowband region, where the control signal comprises a synchronization signal, a PBCH transmission, or a SIB, and the communicating comprises transmitting a RACH preamble.

Some examples of the method, apparatuses, or non-transitory computer-readable medium described above may further include features of, means for, or processor-executable instructions for identifying the third narrowband region based on a group identity of the UE. Some examples may include identifying the third narrowband region based on the control signal.

Some examples of the method, apparatuses, or non-transitory computer-readable medium described above may further include features of, means for, or processor-executable instructions for identifying the third narrowband region based on a configuration known a priori to the UE. In some examples, the first control signal comprises an indication of the second narrowband region.

In some examples of the method, apparatuses, or non-transitory computer-readable medium described above the control signal comprises an MTC SIB. In some examples the retransmission rate of the MTC SIB is 80 milliseconds.

Some examples of the method, apparatuses, or non-transitory computer-readable medium described above may further include features of, means for, or processor-executable instructions for receiving a configuration for the MTC SIB via an enhanced physical downlink control channel (ePDCCH). In some examples, the identification of the second narrowband region is based on a low power operational mode.

A further method of linked narrowband operation for MTC is described. The method may include receiving a control signal from a base station, determining a carrier bandwidth based on the control signal, and identifying a data region based on the carrier bandwidth.

A further apparatus for linked narrowband operation for MTC is described. The apparatus may include means for receiving a control signal from a base station, means for determining a carrier bandwidth based on the control signal, and means for identifying a data region based on the carrier bandwidth.

A further apparatus for linked narrowband operation for MTC is described. The apparatus may include a processor, memory in electronic communication with the processor, and instructions stored in the memory, wherein the instructions are executable by the processor to receive a control signal from a base station, determine a carrier bandwidth based on the control signal, and identify a data region based on the carrier bandwidth.

A further non-transitory computer-readable medium storing code for linked narrowband operation for MTC is also described. The code may include instructions executable by a processor to receive a control signal from a base station, determine a carrier bandwidth based on the control signal, and identify a data region based on the carrier bandwidth.

Some examples of the method, apparatuses, or non-transitory computer-readable medium described above may further include features of, means for, or processor-executable instructions for decoding a PBCH from the control signal, wherein identifying the data region comprises detecting the carrier bandwidth from the PBCH. In some examples, identifying the data region comprises determining a starting symbol index based on the carrier bandwidth detected from the PBCH.

In some examples of the method, apparatuses, or non-transitory computer-readable medium described above identifying the data region comprises identifying a reserve bit of the PBCH. In some examples, the PBCH comprises machine type communication (MTC) specific PBCH information.

A further method of linked narrowband operation for MTC is described. The method may include transmitting a control signal to a UE on resources of a first narrowband region, identifying a second narrowband region based at least in part on the control signal, and communicating with the UE on resources of the second narrowband region.

A further apparatus for linked narrowband operation for MTC is described. The apparatus may include means for transmitting a control signal to a UE on resources of a first narrowband region, means for identifying a second narrowband region based at least in part on the control signal, and means for communicating with the UE on resources of the second narrowband region.

A further apparatus for linked narrowband operation for MTC is described. The apparatus may include a processor, memory in electronic communication with the processor, and instructions stored in the memory, wherein the instructions are executable by the processor to transmit a control signal to a UE on resources of a first narrowband region, identify a second narrowband region based at least in part on the control signal, and communicate with the UE on resources of the second narrowband region.

A further non-transitory computer-readable medium storing code for linked narrowband operation for MTC is also described. The code may include instructions executable by a processor to transmit a control signal to a UE on resources of a first narrowband region, identify a second narrowband region based at least in part on the control signal, and communicate with the UE on resources of the second narrowband region.

Some examples of the method, apparatuses, or non-transitory computer-readable medium described above may further include features of, means for, or processor-executable instructions for providing an explicit indication of the second narrowband region in the control signal. Some examples may include providing a set of available configurations of narrowband regions in the control signal, and the second narrowband region comprises a region selected by the UE from the set of available configurations.

Some examples of the method, apparatuses, or non-transitory computer-readable medium described above may further include features of, means for, or processor-executable instructions for determining the second narrowband region according to a configuration known a priori to the base station. In some examples, communicating comprises receiving a random access channel (RACH) preamble.

Some examples of the method, apparatuses, or non-transitory computer-readable medium described above may further include features of, means for, or processor-executable instructions for identifying a third narrowband region linked to the second narrowband region, and transmitting a RACH response message from the base station on resources of the third narrowband region. In some examples, communicating comprises receiving a connection request on resources of the second narrowband region.

Some examples of the method, apparatuses, or non-transitory computer-readable medium described above may further include features of, means for, or processor-executable instructions for identifying a third narrowband region linked to the second narrowband region, and transmitting a connection setup message on resources of the third narrowband region. In some examples, the first control signal comprises a synchronization signal, a physical broadcast channel (PBCH) transmission, a paging message, or a system information block (SIB).

In some examples of the method, apparatuses, or non-transitory computer-readable medium described above the control signal comprises a paging message, and the communicating comprises receiving a RACH preamble on the resources of the second narrowband region. Some examples may include transmitting a paging message on resources of a third narrowband region, wherein the control signal comprises a synchronization signal, a PBCH transmission, or a SIB, and the communicating comprises receiving a RACH preamble.

Some examples of the method, apparatuses, or non-transitory computer-readable medium described above may further include identifying the third narrowband region based on a group identity of the UE. Some examples may include providing an indication of the third narrowband region in the control signal.

Some examples of the method, apparatuses, or non-transitory computer-readable medium described above may further include features of, means for, or processor-executable instructions for identifying the third narrowband region based on a configuration known a priori to the base station. In some examples the first control signal comprises an indication of the second narrowband region.

In some examples of the method, apparatuses, or non-transitory computer-readable medium described above the control signal comprises an MTC SIB. In some examples the retransmission rate of the MTC SIB is 80 milliseconds.

Some examples of the method, apparatuses, or non-transitory computer-readable medium described above may further include features of, means for, or processor-executable instructions for transmitting a configuration for the MTC SIB via an enhanced physical downlink control channel (ePDCCH). In some examples the identification of the second narrowband region is based on a low power operational mode.

A further method of linked narrowband operation for MTC is described. The method may include generating a PBCH indicative of a starting symbol index for a data region and transmitting the PBCH to a UE.

A further apparatus for linked narrowband operation for MTC is described. The apparatus may include means for generating a PBCH indicative of a starting symbol index for a data region and means for transmitting the PBCH to a UE.

A further apparatus for linked narrowband operation for MTC is described. The apparatus may include a processor, memory in electronic communication with the processor, and instructions stored in the memory, wherein the instructions are executable by the processor to generate a PBCH indicative of a starting symbol index for a data region and transmit the PBCH to a UE.

A further non-transitory computer-readable medium storing code for linked narrowband operation for MTC is also described. The code may include instructions executable by a processor to generate a PBCH indicative of a starting symbol index for a data region and transmit the PBCH to a UE.

In some examples of the method, apparatuses, or non-transitory computer-readable medium described above the PBCH comprises a reserve bit indicative of the starting symbol index. In some examples a bandwidth of the PBCH is indicative of the starting symbol index.

In some examples of the method, apparatuses, or non-transitory computer-readable medium described above the PBCH comprises machine type communication (MTC) specific PBCH information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

A broadband carrier may be divided into narrowband regions, and a UE may identify linked narrowband regions to utilize for different aspects of its communication with a base station. For example, the narrowband regions may be indexed, and the UE may identify an index of a particular narrowband region using information contained (implicitly or explicitly) in a control signal from the base station. That is, the UE may identify the index implicitly as a function of a UE identifier (ID) or a paging group, or explicitly based on a direct indication of the narrowband region in the control signal. The UE may receive the control signal on resources of a first narrowband region and it may communicate with the base station on resources of a second, linked narrowband region. For example, a UE may receive a SIB or a paging message, and perform a random access procedure using narrowband resources selected based on the SIB or paging message.

By linking narrowband regions, an MTC device may effectively communicate using specific resources without monitoring or transmitting over the whole frequency range of a wireless carrier. This may enable more effective narrowband communication. By communicating over a narrow frequency range, an MTC may reduce the amount of power consumed. This may enable MTC devices that are small, of low cost, or of low complexity to operate more effectively in a wireless network environment. For example, using linked narrowband communications, MTC devices may be designed to operate on battery power for a long period of time without depleting a battery.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
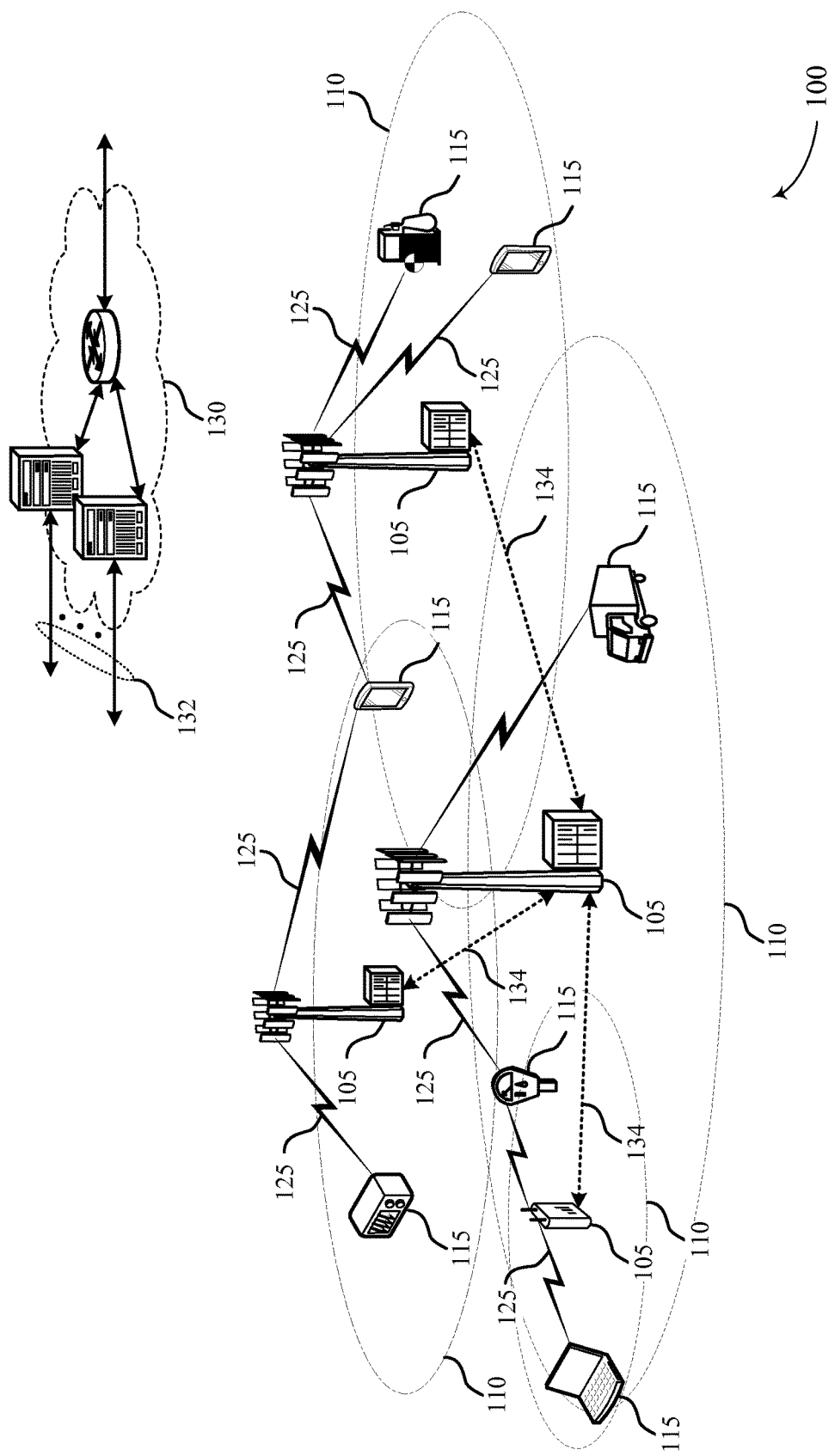
FIG. 1 illustrates an example of a wireless communications system in accordance with various aspects of the present disclosure.

FIG. 1 illustrates an example of a wireless communications system 100 in accordance with various aspects of the present disclosure. The system 100 includes base stations 105, UEs 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the user equipments (UEs) 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-A network. In LTE/LTE-A networks, the term eNB may be generally used to describe the base stations 105. The wireless communications system 100 may be a Heterogeneous LTE/LTE-A network in which different types of evolved node Bs (eNBs) provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105 or core network 130 supporting radio bearers for the user plane data. At the PHY layer, the transport channels may be mapped to Physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. As discussed below, a UE 115 may be an MTC device. A UE 115 may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined.

In some embodiments of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation CA or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Some types of wireless devices may provide for automated communication. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application.

Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

For example, some of the UEs 115 of the system 100 may be referred to as Category 0 UEs 115, which may have certain operating constraints that allow for low cost or low-complexity implementation. For instance, a UE 115 may have a reduced data rate, as compared to other UEs 115 for unicast communications (e.g., transport block size (TBS) of 1000 bits) or broadcast communications (e.g., TBS of 2216 bits). Some of MTC UEs 115 support multimedia broadcast or multicast communications (e.g., MBMS) and may be configured to receive a physical multicast channel (PMCH) with a TBS of 4584 bits. In some cases, an MTC UE 115 is configured with a soft buffer size of 25344 bits for unicast communications.

A frame structure may be used in LTE similar systems to organize physical resources. A frame may be a 10 ms interval that may be further divided into 10 equally sized sub-frames. Each sub-frame may include two consecutive time slots. Each slot may include 6 or 7 orthogonal frequency division multiple access (OFDMA) symbol periods. A resource element consists of one symbol period and one subcarrier (a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signal (CRS) and a UE-specific RS (UE-RS). UE-RS may be transmitted on the resource blocks associated with physical downlink shared channel (PDSCH). The number of bits carried by each resource element may depend on the modulation scheme (the configuration of symbols that may be selected during each symbol period). Thus, the more resource blocks that a UE receives and the higher the modulation scheme, the higher the data rate may be for the UE. MTC devices may, however, effectively communicate using lower data rates. Therefore, use of a narrow communication band may be appropriate.

LTE/LTE-A defines numerous different SIBs according to the type of system information that each SIB conveys. For example, SIB1 includes access information, including cell identity information, and it may indicate whether a UE 115 is allowed to camp on a cell 105. SIB1 also includes cell selection information and information for other SIBs. SIB2 includes access information and parameters related to common and shared channels. SIB3 includes cell reselection parameters. SIB4 and SIB5 include reselection information about neighboring LTE cells. SIB6 through SIB8 include reselection information about non-LTE (e.g., UMTS, GERAN, and CDMA2000) neighboring cells. SIB9 includes the name of a Home eNB. SIB10 through SIB12 include emergency notification information (e.g., tsunami and earthquake warnings). And SIB13 includes information related to multimedia broadcast/multicast service (MBMS) configuration.

A UE 115 attempting to access a wireless network may perform an initial cell search by detecting a primary synchronization signal (PSS) from a base station 105. The PSS may enable synchronization of slot and subframe timing, and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in the central 6 resource blocks (RBs) (or 72 subcarriers) of a carrier. After receiving the PSS and SSS, the UE 115 may receive a master information block (MIB), which may be transmitted in the physical broadcast channel (PBCH). The MIB may contain system bandwidth information, a system frame number (SFN), and a physical HARQ indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2, which may contain RRC configuration information related to random access channel (RACH) procedures, paging, physical uplink control channel (PUCCH), physical uplink shared channel (PUSCH), power control, SRS, and cell barring.

After the UE decodes SIB2, it may transmit a RACH preamble to the base station 105. For example, the RACH preamble may be randomly selected from a set of 64 predetermined sequences. This may enable the base station to distinguish between multiple UEs 115 trying to access the system simultaneously. The base station 105 may respond with a random access response that provides an UL resource grant, a timing advance and a cell radio network temporary identity (C-RNTI). The UE 115 may then transmit a connection request with a temporary mobile subscriber identity (TMSI) (if the UE 115 has previously been connected to the same wireless network) or a random value. The connection request may also indicate the reason the UE 115 is connecting to the network (e.g., emergency, signaling, data exchange, etc.). The base station may respond to the connection request with a contention resolution message addressed to the UE 115, which may provide a new C-RNTI. If the UE 115 receives a contention resolution message with the correct identification, it may proceed with RRC setup. If the UE does not receive a contention resolution message (e.g., if there is a conflict with another UE 115) it may repeat the RACH process by transmitting a new RACH preamble.

According to aspects of the present disclosure, a UE 115 may receive a control signal such as a paging message or a SIB from a base station 105 on resources of a first narrowband region, identify a second narrowband region based on the control signal and communicate with the base station 105 on resources of the second narrowband region. For example, the UE 115 may initiate a RACH procedure using the second narrowband region. In some examples, the UE 115 may receive an MTC-specific SIB, which, as discussed below, may include system information fields that allow the UE 115 to operate in the system without the necessity of decoding other SIBs or physical channels.

Figure 2:
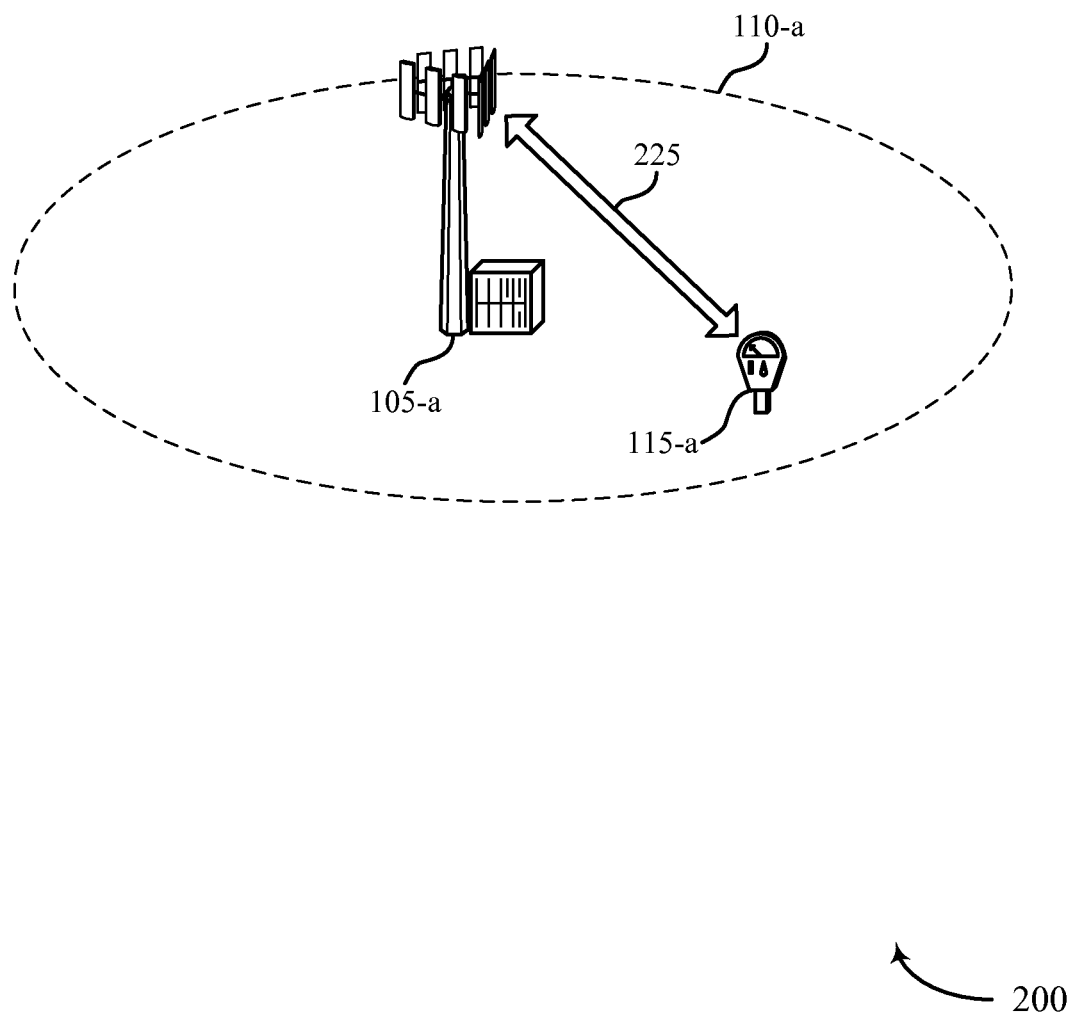
FIG. 2 illustrates an example of a wireless communication system for linked narrowband operation for MTC in accordance with various aspects of the present disclosure.

FIG. 2 illustrates an example of a wireless communication system 200 for linked narrowband operation for MTC in accordance with various aspects of the present disclosure. Wireless communication system 200 may include a base station 105-a communicating with a UE 115-a, which may be an MTC device. Base station 105-a and UE 115-a may communicate via a narrowband-enabled communication link 225 according to aspects of the present disclosure.

For example, UE 115-a may receive a control signal from a base station 105-a on resources of a first narrowband region of narrowband-enabled communication link 225, identify a second narrowband region based on the control signal, and then communicate with the base station 105-a on resources of the second narrowband region.

Figure 3A:
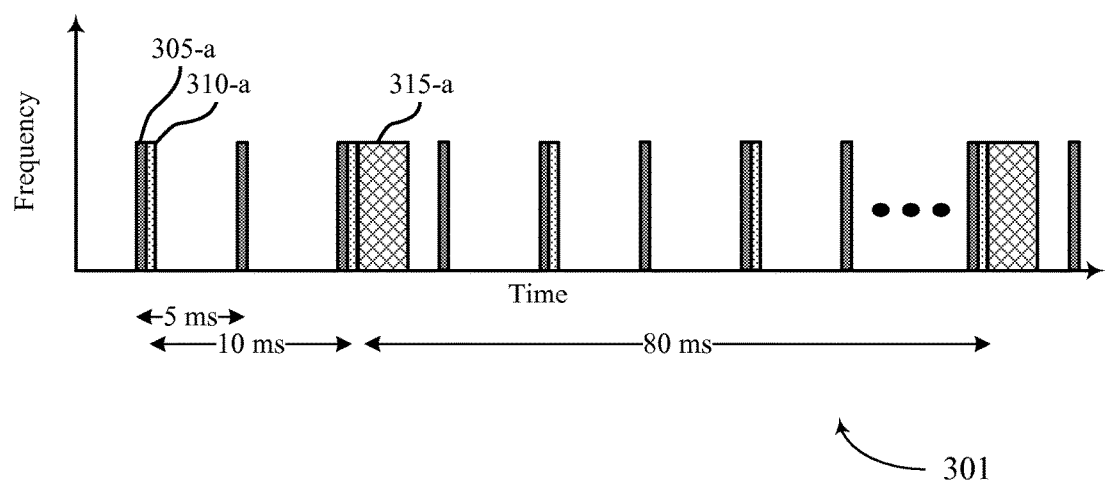
FIG. 3A illustrates an example of a downlink control signal transmission timing for linked narrowband operation for MTC in accordance with various aspects of the present disclosure.

FIG. 3A illustrates an example of downlink (DL) control signal transmission timing 301 for linked narrowband operation for MTC in accordance with various aspects of the present disclosure. The example DL control signal transmission timing 301 may include PSS/SSS 305-a, PBCH 310-a, and SIB 315-a, which may be bundled together with PBCH 310-a.

PSS/SSS 305-a may include a PSS or an SSS transmitted by a base station 105. In some cases, PSS/SSS may be transmitted at 5 ms intervals. PBCH 310-a may include broadcast transmissions of a base station 105-a (e.g., a MIB). In some cases, PBCH 310-a may be transmitted at 10 ms intervals. SIB 315-a may include one or more SIBs. For example, SIB 315-a may include a SIB1, a SIB2, or an MTC-specific SIB modified for transmission to MTC devices.

For example, SIB 315-a may be designed to reduce the SIB overhead by combining information from SIB1 and SIB2 in a message of approximately 300 bits. SIB 315-a may be structured for narrowband transmission and be based on a demodulation reference signal. SIB 315-a may also be associated with a new MTC serving radio network controller (SRNC) radio network temporary identity (MTC-S-RNTI). In some cases, SIB 315-a may be retransmitted every 80 ms, and updated every 640 ms or longer. In examples, some fields (or even entire SIBs) could be absent from an MTC-specific SIB. In one example, SIB 315-a includes an MTC-specific SIB that includes an MTC SIB1 containing essential information, and an MTC SIB2 with non-essential information.

Thus, according to aspects of the present disclosure, a UE 115 may receive a control signal (such as PBCH 310-a or SIB 315-a) from a base station 105 on resources of a first narrowband region, identify a second narrowband region based on the control signal and communicate with the base station 105 on resources of the second narrowband region.

Figure 3B:
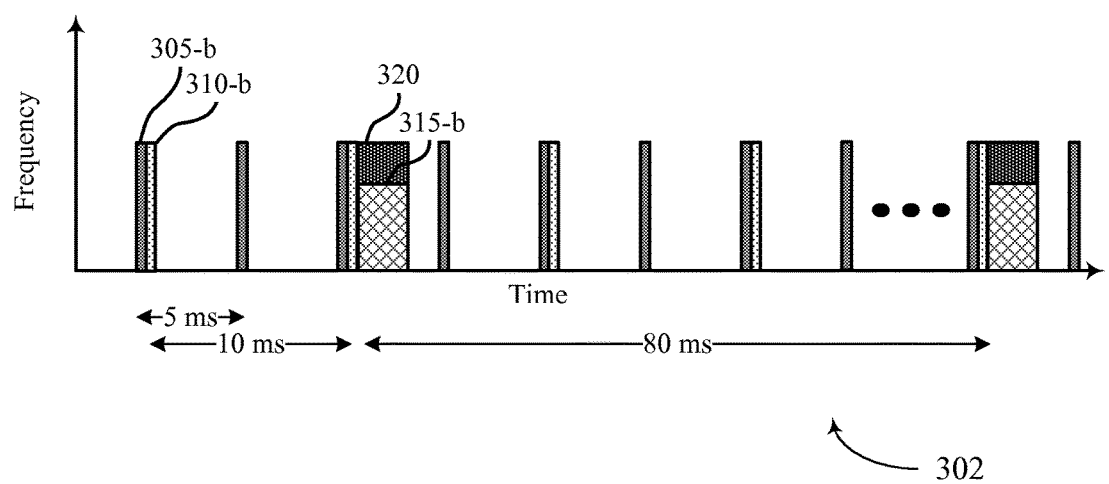
FIG. 3B illustrates an example of a downlink control signal transmission timing for linked narrowband operation for MTC in accordance with various aspects of the present disclosure.

FIG. 3B illustrates an example of DL control signal transmission timing 302 for linked narrowband operation for MTC in accordance with various aspects of the present disclosure. The example DL control signal transmission timing 302 may include PSS/SSS 305-b, PBCH 310-b, SIB 315-b, and enhanced physical downlink control channel (ePDCCH) 320, which may be bundled with PBCH 310-b and SIB 315-b.

PSS/SSS 305-b may include a PSS or an SSS transmitted by a base station 105. PBCH 310-b may include broadcast transmissions of a base station 105-a (e.g., a MIB). SIB 315-b may include one or more SIBs. For example, SIB 315-a may include a SIB1, a SIB2, or an MTC specific SIB modified for transmission to MTC devices as described above with reference to FIGS. 1 and 2, and as described below with reference to FIGS. 4 and 5. In some cases, SIB 315-a may be bundled with ePDCCH 320. In some examples, acquisition of ePDCCH 320 may be prior to, or may enable, acquisition of SIB 315-a.

According to aspects of the present disclosure, a UE 115 may receive a control signal (such as PBCH 310-a or SIB 315-a) from a base station 105 on resources of a first narrowband region, identify a second narrowband region based on the control signal and communicate with the base station 105 on resources of the second narrowband region.

Figure 4:
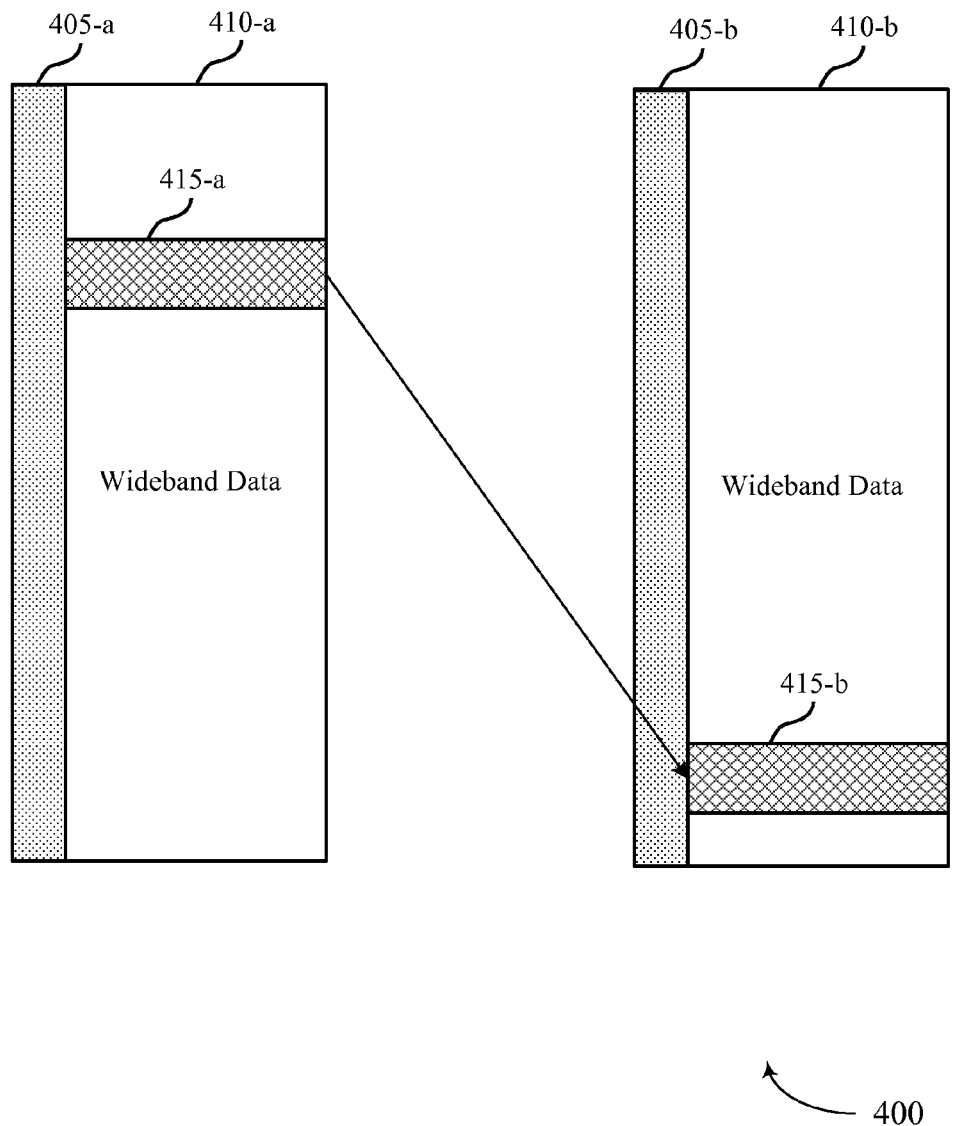
FIG. 4 illustrates an example of narrowband region linking for MTC in accordance with various aspects of the present disclosure.

FIG. 4 illustrates an example of narrowband region linking 400 in accordance with various aspects of the present disclosure. Narrowband region linking 400 may include control region 405-a, wideband data region 410-a, and first narrowband region 415-a during a first time period and control region 405-b, wideband data region 410-b, and second narrowband region 415-b during a second time period.

In some examples, first narrowband region 415-a and second narrowband region 415-b may be 6 RB (or 72 subcarrier) sub-regions of wideband data region 410-a and wideband data region 410-a, respectively. In one example, (e.g., for a 20 MHz carrier) wideband data regions 410-a and 410-b may include 100 RBs (1200 subcarriers), which may be divided into a set of 16 indexed narrowband regions (with 4 RBs remaining that are not allocated to narrowband regions).

First narrowband region 415-a (or second narrowband region 415-b) may be selected from this indexed set of narrowband regions. In some cases, first narrowband region 415-a and second narrowband region 415-b include different frequency resources. In other cases, first narrowband region 415-a and second narrowband region 415-b include the same frequency resources (not shown). A UE 115 may receive a control signal from a base station 105 on resources of a first narrowband region 415-a, identify a second narrowband region 415-b based on the control signal, and communicate with the base station 105 on resources of the second narrowband region 415-b.

Figure 5:
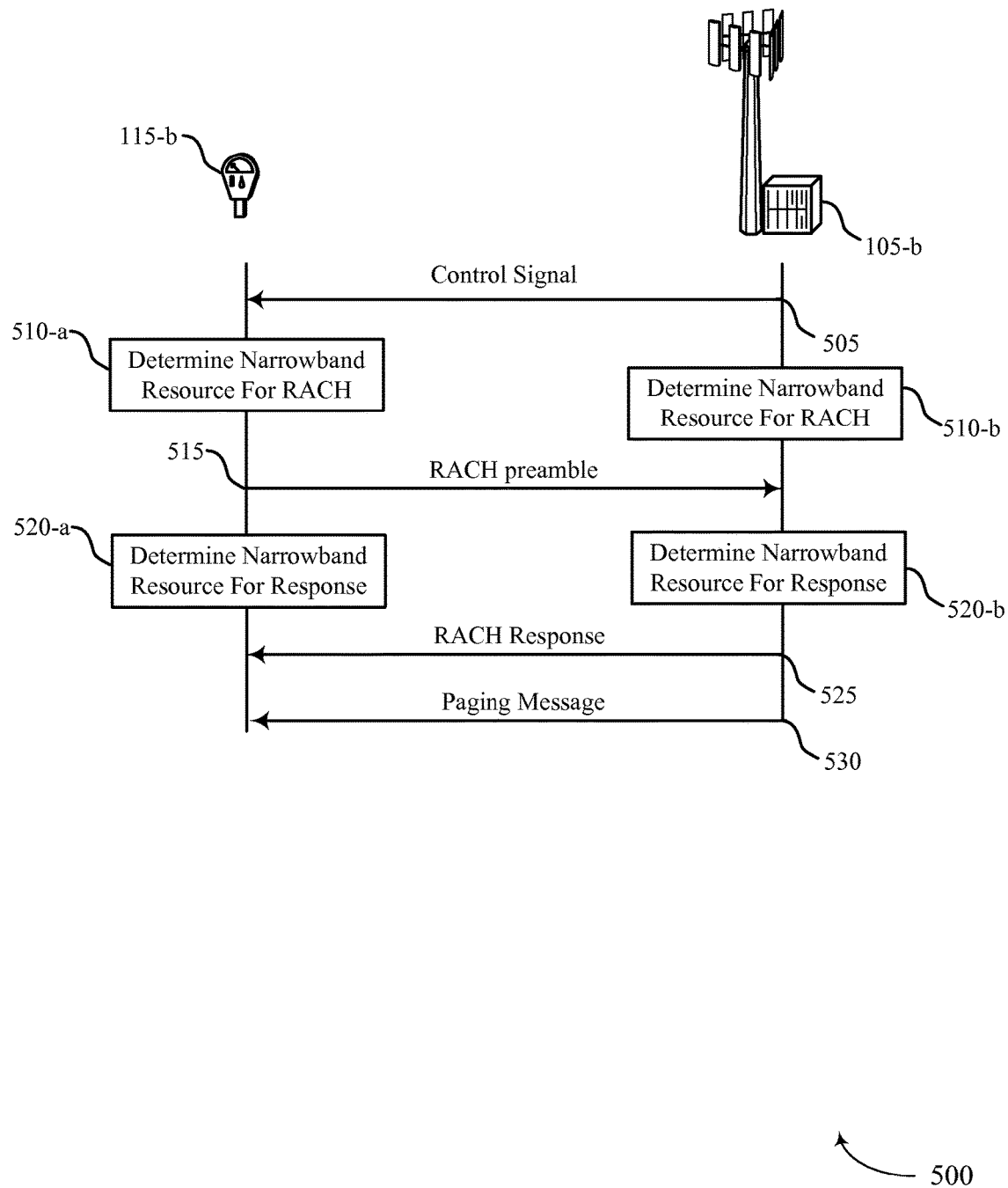
FIG. 5 illustrates an example of a message exchange for linked narrowband operation for MTC in accordance with various aspects of the present disclosure.

FIG. 5 illustrates an example of a message exchange 500 for linked narrowband operation for MTC in accordance with various aspects of the present disclosure. Message exchange 500 may represent messages transmitted and received as well as operations performed by UE 115-b and base station 105-b, which may be examples of a UE 115 and base station 105 as described above with reference to FIGS. 1-4. In some cases, UE 115-b may be an MTC device.

Base station 105-b may transmit, and UE 115-b may receive, a control signal 505 on resources of a first narrowband region 415-a. In some examples, the first control 505 signal includes a synchronization signal, a PBCH transmission, a paging message, or a SIB (such as an MTC specific SIB). In some cases, the control signal 505 may be transmitted from the center 6 RBs of a carrier, and this may be known to both UE 115-b and base station 105-b.

At block 510-a, UE 115-b may identify a second narrowband region 415-b based at least in part on the control signal 505. At block 510-b, base station 105-b may also identify the second narrowband region 415-b based at least in part on the control signal 505. In some examples the identification of the second narrowband region 415-b may be based on a low power operational mode, such as an MTC narrowband operational mode.

In some cases, base station 105-b may provide an explicit indication in the control signal 505, and UE 115-b may determine the second narrowband region 415-b from this explicit indication. In some cases, UE 115-b may determine a set of available configurations of narrowband regions based on the control signal 505.

In some cases, base station 105-b may provide a set of available configurations of narrowband regions in the control signal 505, and UE 115-b may select the second narrowband region 415-b based on the set of available configurations. For example, a broadband or wideband region may be divided into an indexed set of 6 RB narrowband regions.

In some cases, UE 115-b and base station 105-b may determine the second narrowband region 415-b according to a configuration known a priori (to both UE 115-b and the base station 105-b). For example, the narrowband region may be defined in a wireless network specification.

In some examples, UE 115-b may determine a carrier bandwidth based on the control signal 505 (not shown). In this case, UE 115-b may identify a data region based on the carrier bandwidth. For example, UE 115-b may decode a PBCH from the control signal 505, and identify the data region based on the carrier bandwidth from the PBCH. In some examples, identifying the data region includes determining a starting symbol index based on the carrier bandwidth detected from the PBCH. For instance, if the bandwidth of the PBCH is 1.4 MHz, the UE 115-*b* may determine that the data region starts from symbol 4 (e.g., where symbols 0-3 may be used for a legacy control region). If the bandwidth of the PBCH is greater than 1.4 MHz, the UE 115-*b* may determine that the data regions starts from symbol 3 (e.g., where symbols 0-2 may be used for a legacy control region).

In some examples, identifying the data region includes identifying a reserve bit of the PBCH. The PBCH may, for instance, include MTC specific PBCH information. In some examples, a data/control start position may be indicated in a repeated PBCH specific to MTC devices. Thus, the UE 115-*b* may determine a data starting position without relying on either PCFICH (physical control format indicator channel) or RRC signaling.

After identifying the narrowband resources, UE 115-*b* and base station 105-*b* may communicate using the identified resources (i.e., the second narrowband region 415-*b*). In some examples, communicating includes UE 115-*b* transmitting (and base station 105-*b* receiving) a RACH preamble 515. In other examples, communicating includes UE 115-*b* transmitting (and base station 105-*b* receiving) a connection request.

After the initial communication, UE 115-*b* and base station 105-*b* may identify a third narrowband region linked to the second narrowband region 415-*b*. For example, after the RACH preamble 515, UE 115-*b* and base station 105-*b* may determine that subsequent messages will be on the same narrowband region as the RACH preamble 515. In other cases, subsequent messages may be on a different region than second narrowband region 415-*b*, but based implicitly on the second narrowband region 415-*b*.

In the case that UE 115-*b* transmitted a RACH preamble on the second narrowband region 415-*b*, base station 105-*b* may transmit (and UE 115-*b* may receive) a RACH response message 525 using resources of the third narrowband region. In the case that UE 115-*b* transmitted a connection request on the second narrowband region 415-*b*, base station 105-*b* may transmit (and UE 115-*b* may receive) a connection setup message using resources of the third narrowband region.

In some examples, narrowband linking may also be used to coordinate the transmission and reception of a paging message 530. In some cases, paging message 530 may be transmitted using the center 6 RBs of a carrier and RACH preamble 515 may be transmitted using resources other than the center 6 RBs. Thus, in some cases, UE 115-*b* may tune away if it is paged or if it has to perform RACH for data transmissions.

Several variations for the link between the resources used for the RACH preamble 515 and paging message 530 may be possible in this case. For example, UE 115-*b* and base station 105-*b* may identify the third narrowband region (for paging) based on a group identity of UE 115-*b*, based on the control signal 505, or based on a configuration known a priori to both devices.

In other cases, paging message 530 may be transmitted using resources other than the center 6 RBs. If base station 105-*b* is communicating with a large number of MTC devices, this may allow the paging to be distributed across different narrowband regions. In this case, base station 105-*b* may signal a paging configuration to UE 115-*b*. The narrowband region used for paging may be based on an MTC device group, by the previous (second) narrowband region used by UE 115-*b*, using a fixed frequency location previously signaled to UE 115-*b* (i.e. explicit signaling), or by an implicit derivation based, for example, on the second narrowband region 415-*b* together with a paging group or a UE identity (ID).

Figure 6:
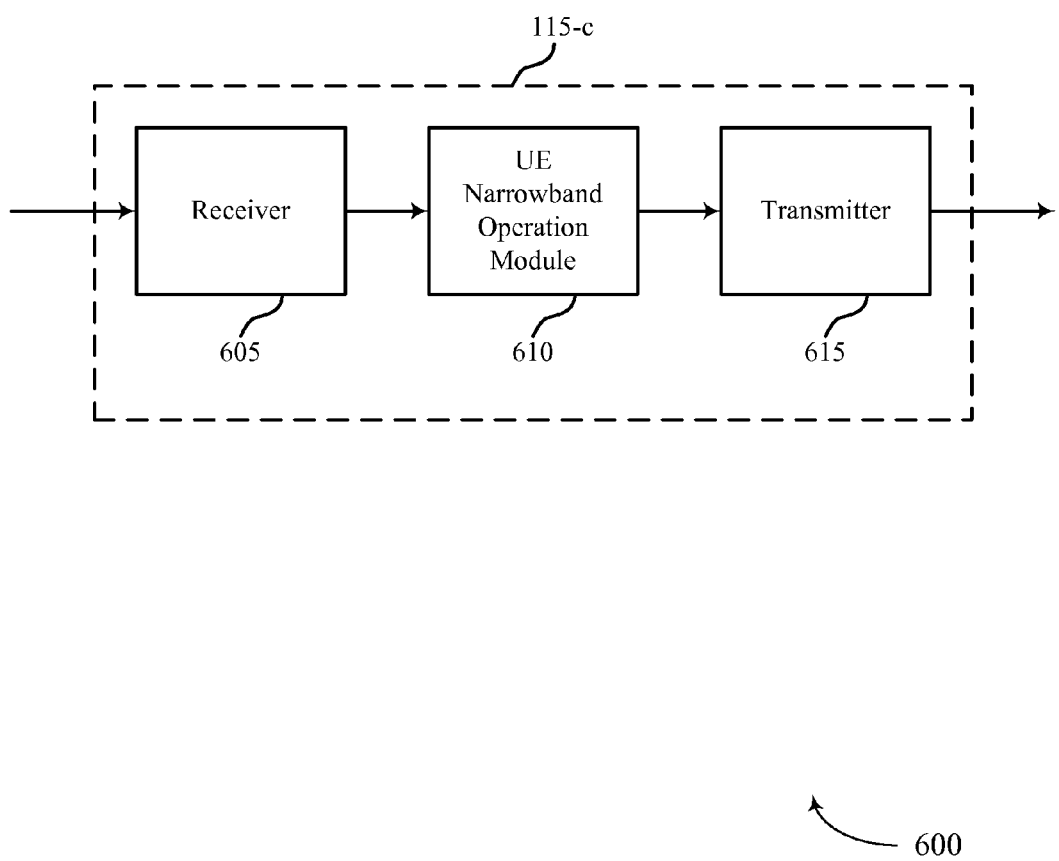
FIG. 6 shows a block diagram of a UE configured for linked narrowband operation for MTC in accordance with various aspects of the present disclosure.

Next, FIG. 6 shows a block diagram 600 of a UE 115-*c* configured for linked narrowband operation for MTC in accordance with various aspects of the present disclosure. The UE 115-*c* may be an example of aspects of a UE 115 described with reference to FIGS. 1-5. The UE 115-*c* may include a receiver 605, a UE narrowband operation module 610, or a transmitter 615. The UE 115-*c* may also include a processor. Each of these components may be in communication with each other.

The components of the UE 115-*c* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

The receiver 605 may receive information such as packets, user data, or control information associated with various information channels (e.g., control signals, RACH responses, connection setup messages, paging messages, etc.). Information may be passed on to the UE narrowband operation module 610, and to other components of the UE 115-*c*. For example, the receiver 605 may receive a RACH response or a connection setup message on resources of a third narrowband region, as described above with reference to FIG. 4.

The UE narrowband operation module 610 may receive a control signal from a base station 105 on resources of a first narrowband region, identify a second narrowband region based at least in part on the control signal, and communicate with the base station 105 on resources of the second narrowband region.

The transmitter 615 may transmit signals received from other components of the UE 115-*c*. In some embodiments, the transmitter 615 may be collocated with the receiver 605 in a transceiver module. The transmitter 615 may include a single antenna, or it may include a plurality of antennas.

Figure 7:
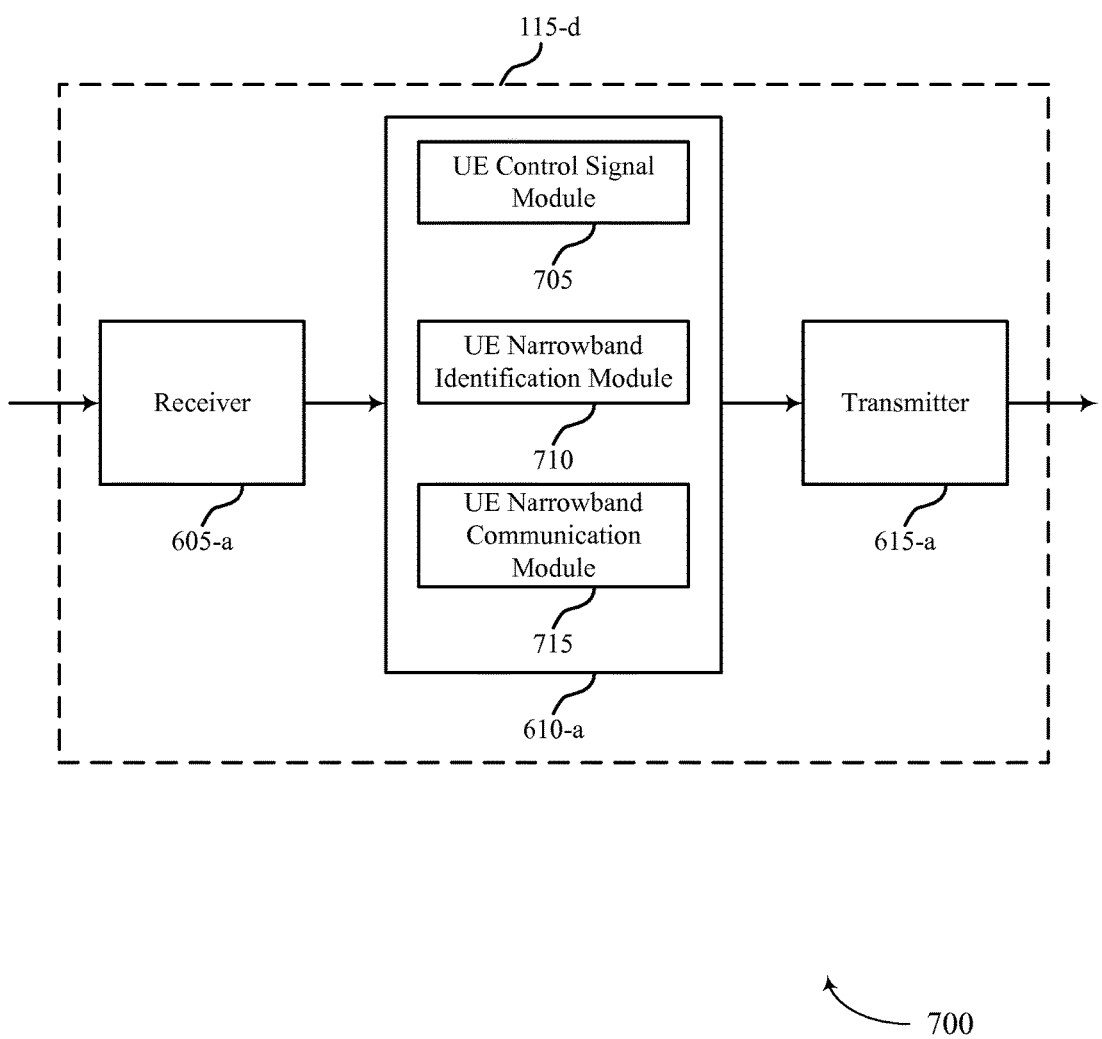
FIG. 7 shows a block diagram of a UE configured for linked narrowband operation for MTC in accordance with various aspects of the present disclosure.

FIG. 7 shows a block diagram 700 of a UE 115-*d* configured for linked narrowband operation for MTC in accordance with various aspects of the present disclosure. The UE 115-*d* may be an example of aspects of a UE 115 described with reference to FIGS. 1-6. The UE 115-*d* may include a receiver 605-*a*, a UE narrowband operation module 610-*a*, or a transmitter 615-*a*. The UE 115-*d* may also include a processor. Each of these components may be in communication with each other. The UE narrowband operation module 610-*a* may also include a UE control signal module 705, a UE narrowband identification module 710, and a UE narrowband communication module 715.

The components of the UE 115-*d* may, individually or collectively, be implemented with at least one ASIC adapted to perform some or all of the applicable functions in hardware. Alternatively, the functions may be performed by one or more other processing units (or cores), on one or more ICs. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 605-*a* may receive information which may be passed on to the UE narrowband operation module 610-*a*, and to other components of the UE 115-*d*. The UE narrowband operation module 610-*a* may perform the operations described above with reference to FIG. 6. The transmitter 615-*a* may transmit signals received from other components of the UE 115-*d*.

The UE control signal module 705 may receive a control signal from a base station 105 on resources of a first narrowband region as described above with reference to FIGS. 2-5. In some examples, the first control signal includes a synchronization signal, a PBCH transmission, a paging message, or a SIB. In some examples, the first control signal includes an indication of the second narrowband region. The control signal may, for instance, include an MTC SIB. In some examples, the retransmission rate of the MTC SIB may be 80 milliseconds. The UE control signal module 705 may also receive a configuration for the MTC SIB via an ePDCCH, as described above with reference to FIGS. 2-5.

The UE narrowband identification module 710 may identify a second narrowband region based at least in part on the control signal as described above with reference to FIGS. 2-5. In some cases, the UE narrowband identification module 710 may determine the second narrowband region from an explicit indication in the control signal, as described above with reference to FIG. 5. In some case, the UE narrowband identification module 710 may determine a set of available configurations of narrowband regions based on the control signal and select the second narrowband region based on the set of available configurations as described above with reference to FIG. 5. In some cases, the UE narrowband identification module 710 may determine the second narrowband region according to a configuration known a priori to the UE 115-*d* as described above with reference to FIG. 5.

The UE narrowband identification module 710 may also identify a third narrowband region linked to the second narrowband region, as described above with reference to FIG. 5. In some case, the UE narrowband identification module 710 may identify the third narrowband region based on a group identity of the UE as described above with reference to FIG. 5. In some cases, the UE narrowband identification module 710 may identify the third narrowband region based on the control signal, as described above with reference to FIG. 5. In some cases, the UE narrowband identification module 710 may identify the third narrowband region based on a configuration known a priori to the UE 115-*d*, as described above with reference to FIG. 2.

The UE narrowband communication module 715 may communicate with the base station on resources of the second narrowband region, as described above with reference to FIGS. 2-5.

Figure 8:
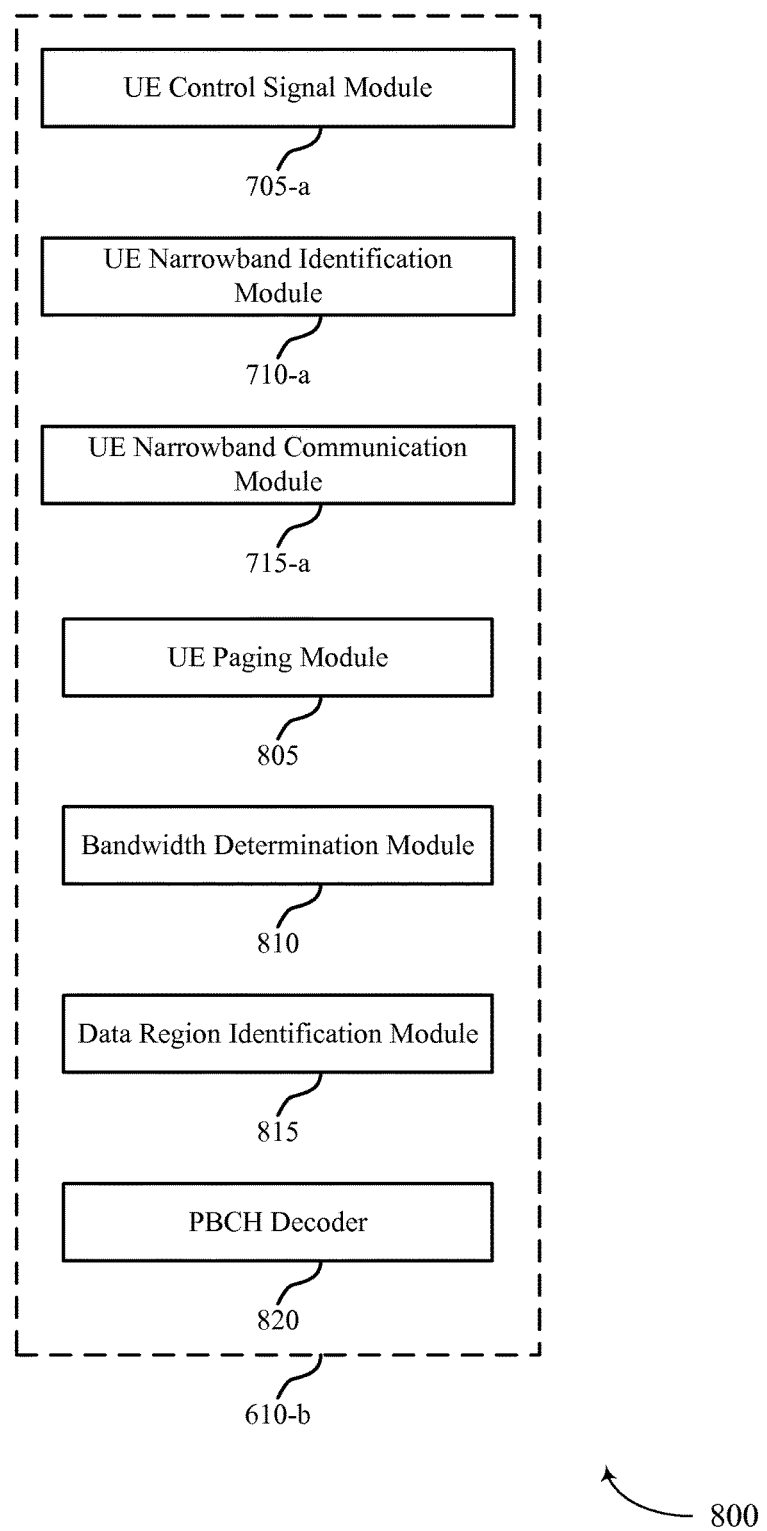
FIG. 8 shows a block diagram of a UE configured for linked narrowband operation for MTC in accordance with various aspects of the present disclosure.

FIG. 8 shows a block diagram 800 of a UE narrowband operation module 610-*b* configured for linked narrowband operation for MTC in accordance with various aspects of the present disclosure. The UE narrowband operation module 610-*b* may be an example of aspects of a UE narrowband operation module 610 described with reference to FIGS. 6 and 7. The UE narrowband operation module 610-*b* may include a UE control signal module 705-*a*, a UE narrowband identification module 710-*a*, and a UE narrowband communication module 715-*a*. Each of these modules may perform the functions described above with reference to FIG. 7. The UE narrowband operation module 610-*b* may also include a UE paging module 805, a bandwidth determination module 810, a data region identification module 815, and a PBCH decoder 820.

The components of the UE narrowband operation module 610-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The UE paging module 805 may be configured such that the control signal may include a paging message as described above with reference to FIG. 5. The UE paging module 805 may also be configured to receive a paging message on resources of a third narrowband region. The control signal may include a synchronization signal, a PBCH transmission, or a SIB as described above with reference to FIGS. 2-5.

The bandwidth determination module 810 may determine a carrier bandwidth based on the control signal as described above with reference to FIG. 5.

The data region identification module 815 may identify a data region based on the carrier bandwidth or reserve bit as described above with reference to FIG. 5. In some examples, identifying the data region includes determining a starting symbol index based on the carrier bandwidth detected from the PBCH. In some examples, identifying the data region includes identifying a reserve bit of the PBCH.

The PBCH decoder 820 may decode a PBCH from the control signal. In some cases, identifying the data region includes detecting the carrier bandwidth from the PBCH as described above with reference to FIG. 5. In some examples, the PBCH includes MTC specific PBCH information.

Figure 9:
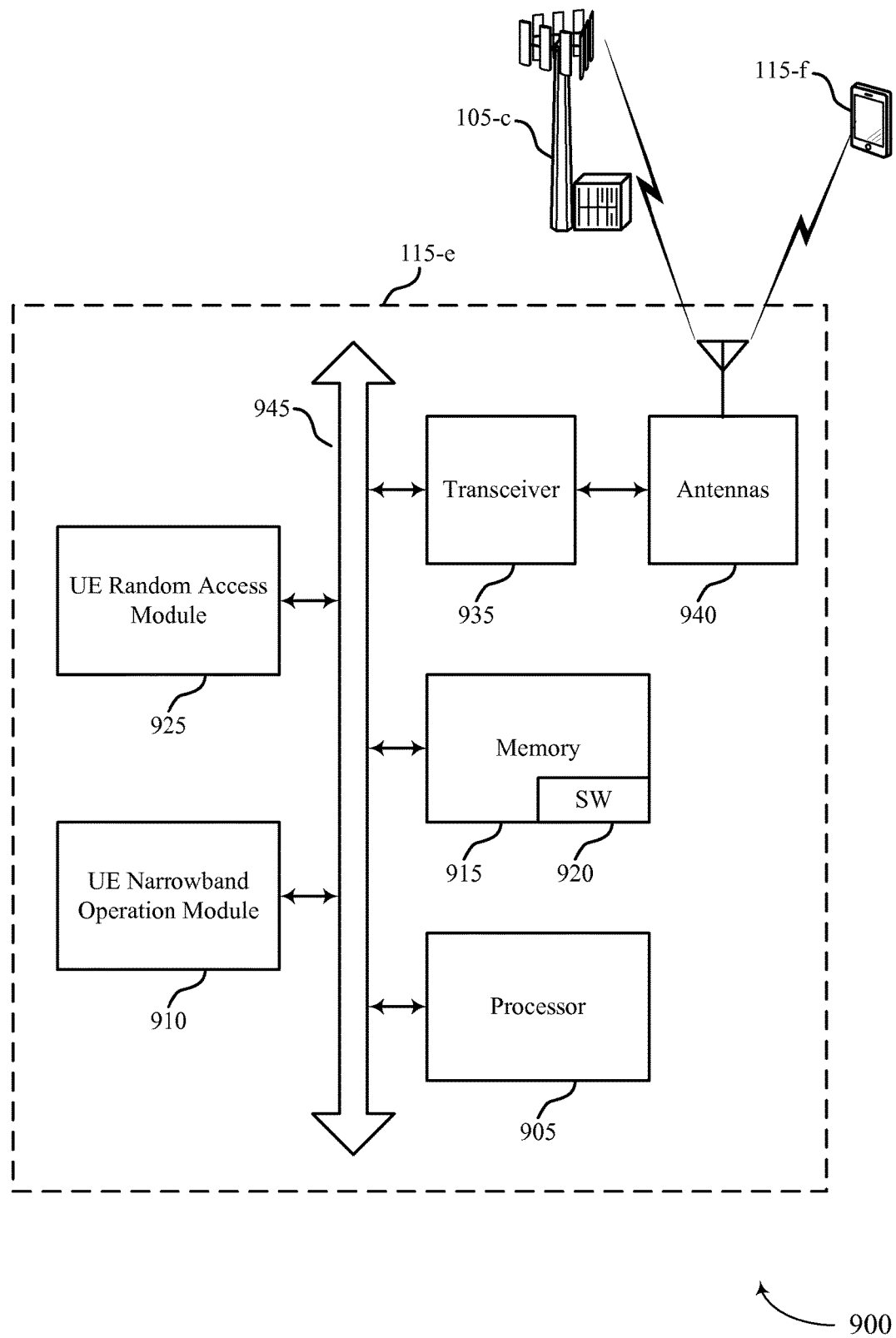
FIG. 9 illustrates a block diagram of a system for linked narrowband operation for MTC in accordance with various aspects of the present disclosure.

FIG. 9 shows a diagram of a system 900 for linked narrowband operation for MTC in accordance with various aspects of the present disclosure. System 900 may include a UE 115-*e*, which may be an example of an UE 115 described with reference to FIGS. 1-8. The UE 115-*e* may include a UE narrowband operation module 910, which may be an example of a UE narrowband operation module 610, as described with reference to FIGS. 6-8. The UE 115-*e* may also include a UE random access module 925. The UE 115-*e* may also include components for bi-directional voice and data communications including components for transmitting communications and components for receiving communications. For example, UE 115-*e* may communicate with base station 105-*c* or with UE 115-*f*.

The UE random access module 925 may be configured to conduct RACH operations, which may include transmitting a RACH preamble as described above with reference to FIG. 5. The RACH operation may include selecting a RACH sequence at random, transmitting the RACH preamble, receiving a RACH response, transmitting a connection request, and receiving a contention resolution message.

The UE 115-e may also include a processor module 905, and memory 915 (including software (SW) 920), a transceiver module 935, and one or more antenna(s) 940, which each may communicate, directly or indirectly, with each other (e.g., via buses 945). The transceiver module 935 may communicate bi-directionally, via the antenna(s) 940 or wired or wireless links, with one or more networks, as described above. For example, the transceiver module 935 may communicate bi-directionally with a base station 105. The transceiver module 935 may include a modem to modulate the packets and provide the modulated packets to the antenna(s) 940 for transmission, and to demodulate packets received from the antenna(s) 940. While the UE 115-e may include a single antenna 940, the UE 115-e may also have multiple antennas 940 capable of concurrently transmitting or receiving multiple wireless transmissions. The transceiver module 935 may also be capable of concurrently communicating with one or more base stations 105.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., linked narrowband operation for MTC, etc.). Alternatively, the software/firmware code 920 may not be directly executable by the processor module 905 but cause a computer (e.g., when compiled and executed) to perform functions described herein. The processor module 905 may include an intelligent hardware device (e.g., a central processing unit (CPU), a microcontroller, an ASIC, etc.).

Figure 10:
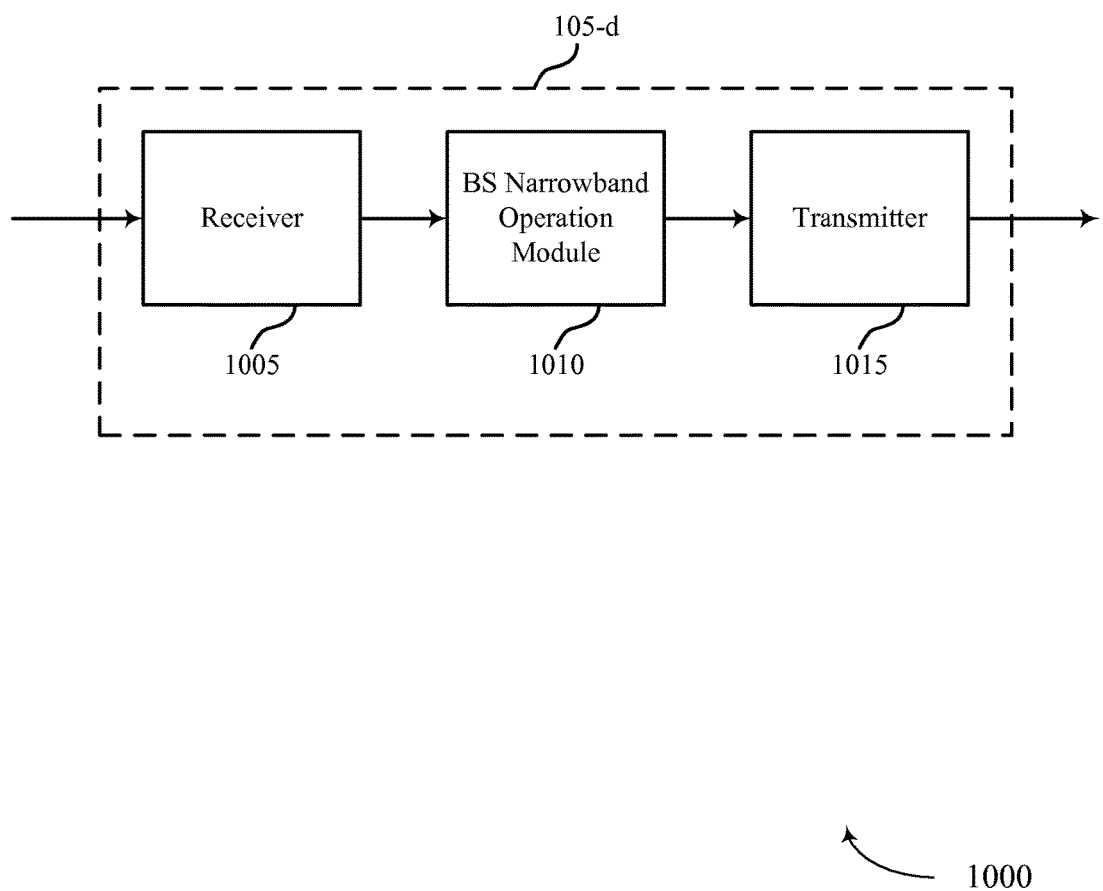
FIG. 10 shows a block diagram of a base station configured for linked narrowband operation for MTC in accordance with various aspects of the present disclosure.

FIG. 10 shows a block diagram 1000 of a base station 105-d configured for linked narrowband operation for MTC in accordance with various aspects of the present disclosure. The base station 105-d may be an example of aspects of a base station 105 described with reference to FIGS. 1-9. The base station 105-d may include a receiver 1005, a BS narrowband operation module 1010, or a transmitter 1015. The base station 105-d may also include a processor. Each of these components may be in communication with each other.

The components of the base station 105-d may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 1005 may receive information such as packets, user data, or control information associated with various information channels (e.g., control channels, data channels, etc.). Information may be passed on to the BS narrowband operation module 1010, and to other components of the base station 105-d.

The BS narrowband operation module 1010 may transmit a control signal to a UE 115 on resources of a first narrowband region, identify a second narrowband region based at least in part on the control signal and communicate with the UE 115 on resources of the second narrowband region.

The transmitter 1015 may transmit signals received from other components of the base station 105-d. In some embodiments, the transmitter 1015 may be collocated with the receiver 1005 in a transceiver module. The transmitter 1015 may include a single antenna, or it may include a plurality of antennas. In some examples, the transmitter 1015 may transmit a control signal on a first narrowband region, and a RACH response message, a connection setup message, or a paging message on resources of the third narrowband region.

Figure 11:
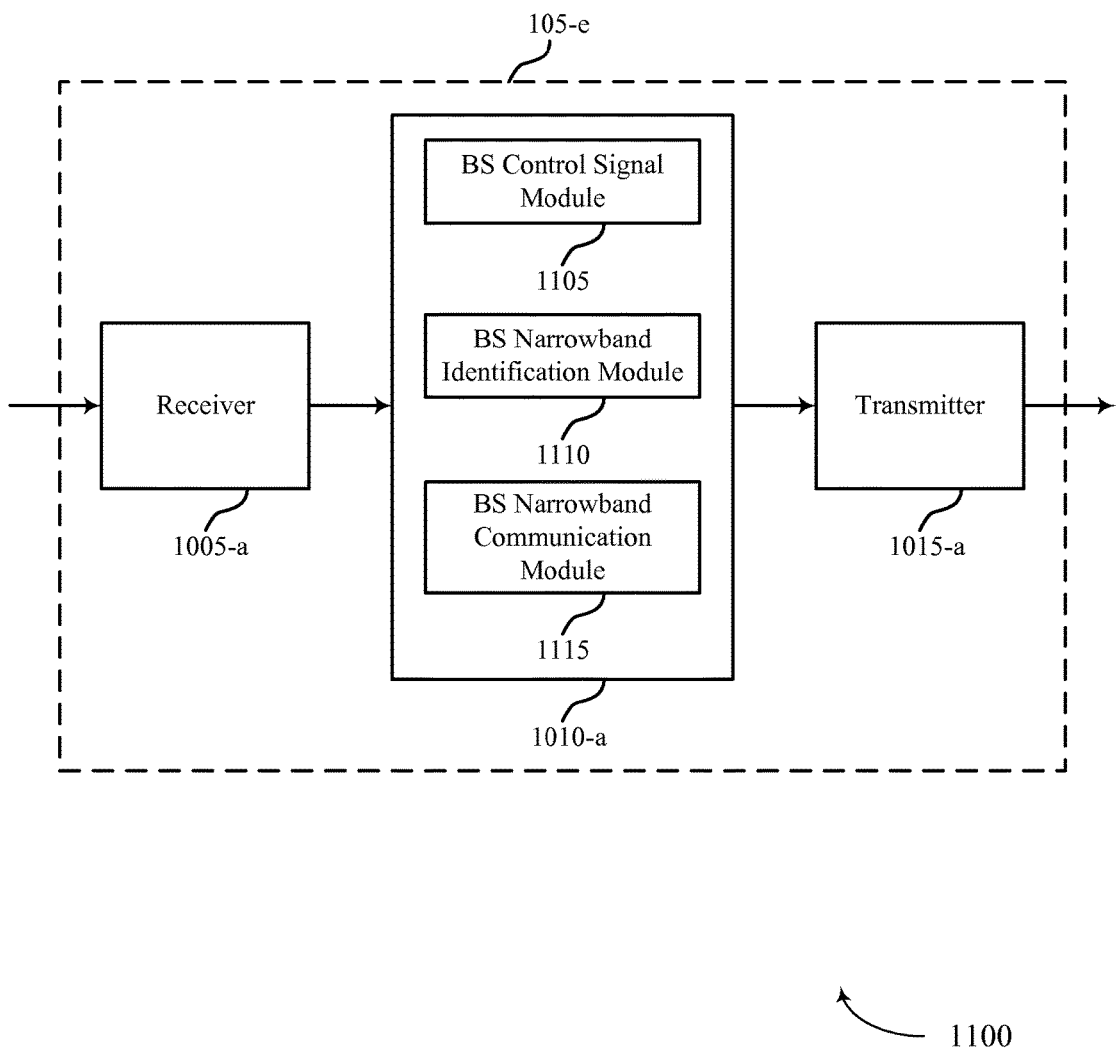
FIG. 11 shows a block diagram of a base station configured for linked narrowband operation for MTC in accordance with various aspects of the present disclosure.

FIG. 11 shows a block diagram 1100 of a base station 105-e configured for linked narrowband operation for MTC in accordance with various aspects of the present disclosure. The base station 105-e may be an example of aspects of a base station 105 described with reference to FIGS. 1-10. The base station 105-e may include a receiver 1005-a, a BS narrowband operation module 1010-a, or a transmitter 1015-a. The base station 105-e may also include a processor. Each of these components may be in communication with each other. The BS narrowband operation module 1010-a may also include a BS control signal module 1105, a BS narrowband identification module 1110, and a BS narrowband communication module 1115.

The components of the base station 105-e may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 1005-a may receive information which may be passed on to the BS narrowband operation module 1010-a, and to other components of the base station 105-e. The BS narrowband operation module 1010-a may perform the operations described above with reference to FIG. 10. The transmitter 1015-a may transmit signals received from other components of the base station 105-e.

The BS control signal 505 module 1105 may transmit a control signal to a UE on resources of a first narrowband region, as described above with reference to FIGS. 2-5. In some examples, the first control signal includes a synchronization signal, a PBCH transmission, a paging message, or a SIB. In some examples, the first control signal 505 includes an indication of the second narrowband region. In some examples, the control signal includes an MTC SIB. In some examples, the retransmission rate of the MTC SIB may be 80 milliseconds. The BS control signal module 1105 may also transmit a configuration for the MTC SIB via an ePDCCH, as described above with reference to FIGS. 2-5.

The BS narrowband identification module 1110 may identify a second narrowband region based on the control signal, as described above with reference to FIGS. 2-5. In some examples, the BS narrowband identification module 1110 may provide an explicit indication of the second narrowband region in the control signal, as described above with reference to FIGS. 2-5. The BS narrowband identification module 1110 may also provide a set of available configurations of narrowband regions in the control signal such that the second narrowband region includes a region selected by the UE from the set of available configurations. In some examples, the BS narrowband identification module 1110 may also determine the second narrowband region according to a configuration known a priori to the base station 105-*e*, as described above with reference to FIGS. 2-5.

The BS narrowband identification module 1110 may also identify a third narrowband region linked to the second narrowband region, as described above with reference to FIGS. 2-5. The BS narrowband identification module 1110 may identify the third narrowband region based on a group identity of the UE, as described above with reference to FIGS. 2-5. The BS narrowband identification module 1110 may, in some cases, provide an indication of the third narrowband region in the control signal, as described above with reference to FIGS. 2-5. The BS narrowband identification module 1110 may also identify the third narrowband region based on a configuration known a priori to the base station 105-*e*, as described above with reference to FIGS. 2-5. In some examples, the identification of the second narrowband region may be based on a low power operational mode.

The BS narrowband communication module 1115 may communicate with the UE on resources of the second narrowband region, as described above with reference to FIGS. 2-5.

Figure 12:
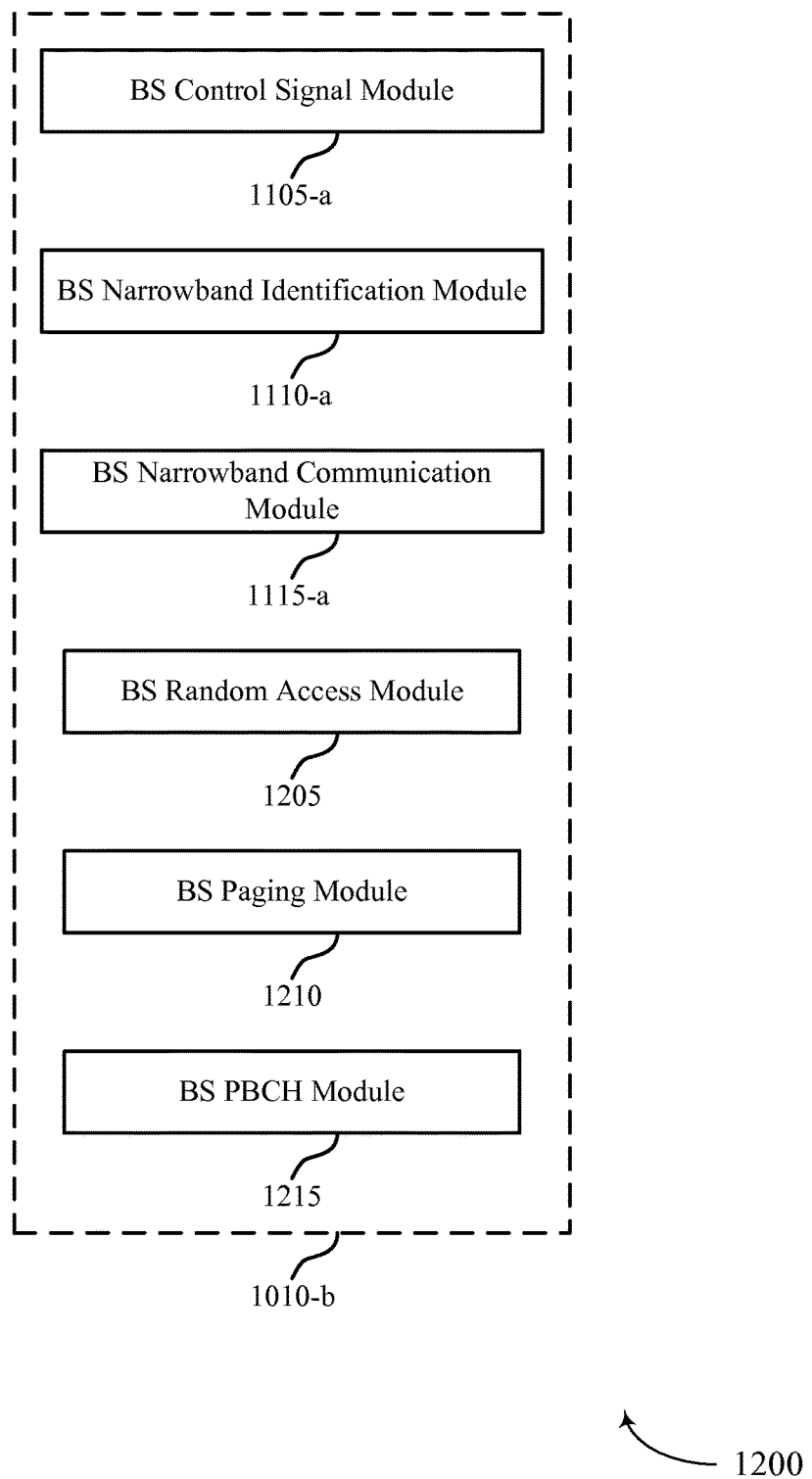
FIG. 12 shows a block diagram of a base station configured for linked narrowband operation for MTC in accordance with various aspects of the present disclosure.

FIG. 12 shows a block diagram 1200 of a BS narrowband operation module 1010-*b* for linked narrowband operation for MTC in accordance with various aspects of the present disclosure. The BS narrowband operation module 1010-*b* may be an example of aspects of a BS narrowband operation module 1010 described with reference to FIGS. 10 and 11. The BS narrowband operation module 1010-*b* may include a BS control signal module 1105-*a*, a BS narrowband identification module 1110-*a*, and a BS narrowband communication module 1115-*a*. Each of these modules may perform the functions described above with reference to FIG. 12. The BS narrowband operation module 1010-*b* may also include a BS random access module 1205, a BS paging module 1210, and a BS PBCH module 1215.

The components of the BS narrowband operation module 1010-*b* may, individually or collectively, be implemented with at least one ASIC adapted to perform some or all of the applicable functions in hardware. Alternatively, the functions may be performed by one or more other processing units (or cores), on an IC or ICs. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The BS random access module 1205 may be configured such that communicating may include receiving a RACH preamble, as described above with reference to FIGS. 2-5. The BS random access module 1205 may also transmit a RACH response message from the base station 105 on resources of the third narrowband region, as described above with reference to FIGS. 2-5. In some examples, communicating includes receiving a connection request on resources of the second narrowband region. In some examples, the communicating includes receiving a RACH preamble on the resources of the second narrowband region. In some examples, the communicating includes receiving a RACH preamble.

The BS paging module 1210 may be configured such that the control signal may include a paging message as described above with reference to FIGS. 2-5. The BS paging module 1210 may also transmit a paging message on resources of a third narrowband region, and the control signal may include a synchronization signal, a PBCH transmission, or a SIB, as described above with reference to FIGS. 2-5.

The BS PBCH module 1215 may generate a PBCH indicative of a starting symbol index for a data region, as described above with reference to FIG. 5; and, in conjunction with transmitter 1015-*b*, may transmit the PBCH to a UE. In some examples, the PBCH includes a reserve bit indicative of the starting symbol index. In some examples, a bandwidth of the PBCH may be indicative of the starting symbol index. In some examples, the PBCH includes MTC specific PBCH information.

Figure 13:
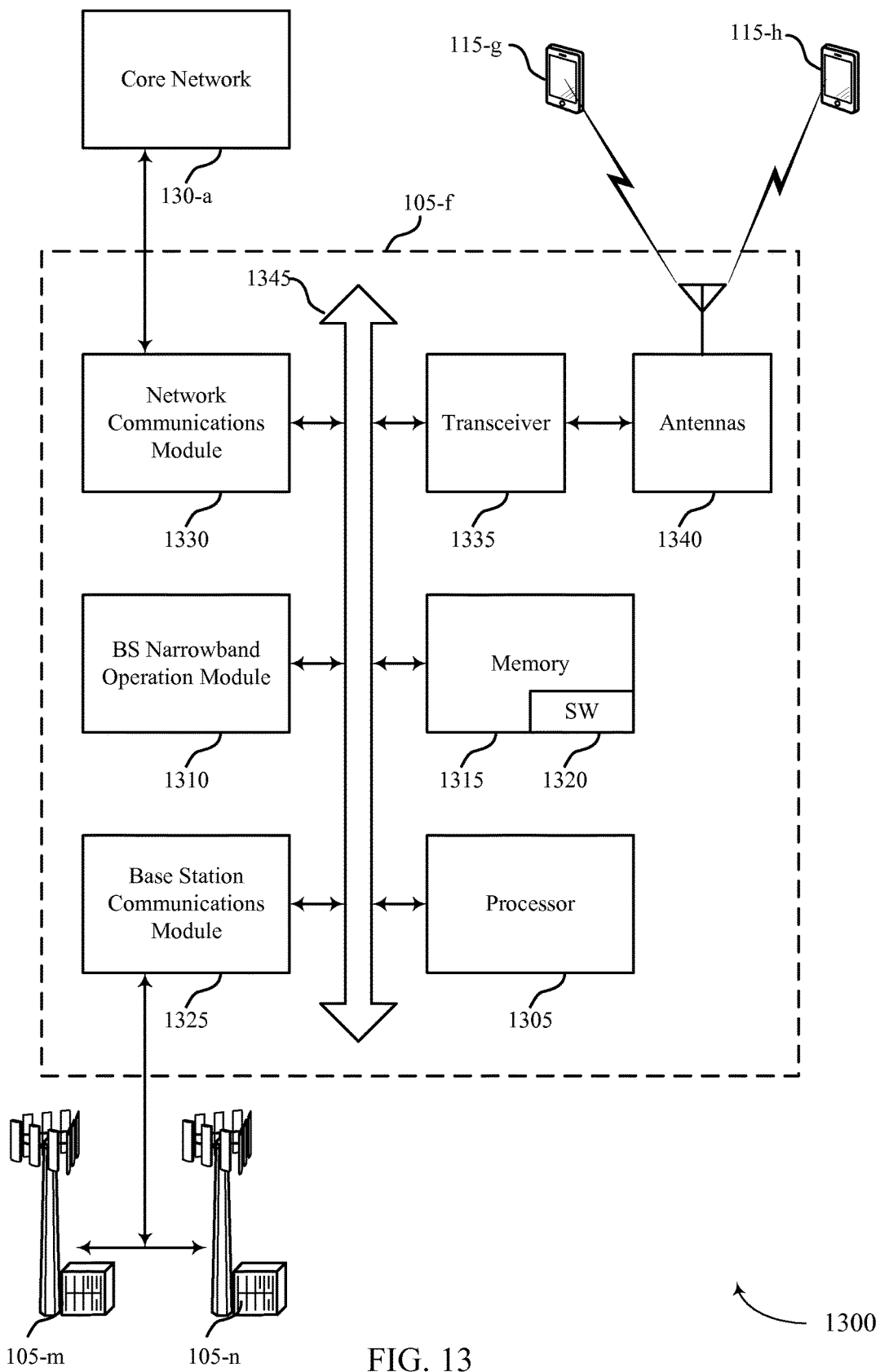
FIG. 13 illustrates a block diagram of a system for linked narrowband operation for MTC in accordance with various aspects of the present disclosure.

FIG. 13 illustrates a block diagram of a system 1300 for linked narrowband operation for MTC in accordance with various aspects of the present disclosure. System 1300 may include an example of a base station 105 as described above with reference to FIGS. 1-5. The base station 105-*f* may include components for bi-directional voice and data communications including components for transmitting communications and components for receiving communications. For example, base station 105-*f* may communicate with UEs 115-*g* and 115-*h*.

In some cases, the base station 105-*f* may have one or more wired backhaul links. The base station 105-*f* may have a wired backhaul link (e.g., S1 interface, etc.) to the core network 130. The base station 105-*f* may also communicate with other base stations 105, such as base station 105-*m* and base station 105-*n* via inter-base station communication links (e.g., X2 interface, etc.). Each of the base stations 105 may communicate with UEs 115 using the same or different wireless communications technologies. In some cases, base station 105-*f* may communicate with other base stations such as 105-*m* or 105-*n* utilizing base station communication module 1325. In some examples, base station communication module 1325 may provide an X2 interface within an LTE/LTE-A wireless communication network technology to provide communication between some of the base stations 105. In some embodiments, base station 105-*f* may communicate with other base stations through core network 130. For example, base station 105-*f* may communicate with the core network 130 through network communications module 1330.

The base station 105-*f* may include a processor module 1305, memory 1315 (including software (SW) 1320), transceiver modules 1335, and antenna(s) 1340, which each may be in communication, directly or indirectly, with each other (e.g., over bus system 1345). The transceiver modules 1335 may be configured to communicate bi-directionally, via the antenna(s) 1340, with the UEs 115, which may be multi-mode devices. The transceiver module 1335 (or other components of the base station 105-*f*) may also be configured to communicate bi-directionally, via the antennas 1340, with one or more other base stations (e.g., base station 105-*m* or base station 105-*n*). The transceiver module 1335 may include a modem configured to modulate the packets and provide the modulated packets to the antennas 1340 for transmission, and to demodulate packets received from the antennas 1340. The base station 105-*f* may include multiple transceiver modules 1335, each with one or more associated antennas 1340. The transceiver module may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor module 1310 to perform various functions described herein (e.g., communicating on linked narrowband regions, etc.). Alternatively, the software 1320 may not be directly executable by the processor module 1305 but be configured to cause the computer (e.g., when compiled and executed) to perform functions described herein.

The processor module 1305 may include an intelligent hardware device (e.g., a CPU, a microcontroller, an ASIC, etc.). The processor module 1305 may include various special purpose processors such as encoders, queue processing modules, base band processors, radio head controllers, digital signal processors (DSPs), and the like.

The base station communications module 1325 may manage communications with other base stations 105. The base station communications module 1325 may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

Figure 14:
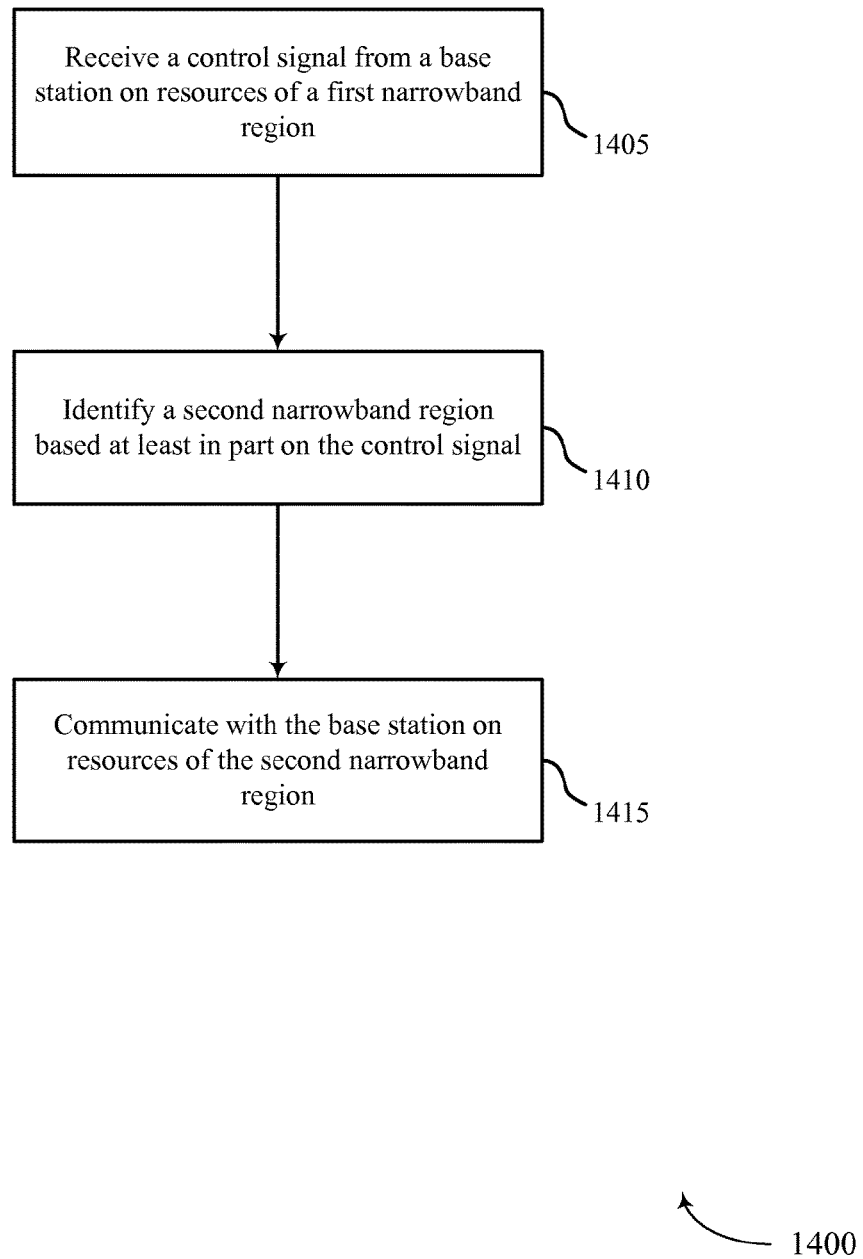
FIG. 14 shows a flowchart illustrating a method for linked narrowband operation for MTC in accordance with various aspects of the present disclosure.

FIG. 14 shows a flowchart illustrating a method 1400 for linked narrowband operation for MTC in accordance with various aspects of the present disclosure. The operations of method 1400 may be implemented by a UE 115 and its components, as described with reference to FIGS. 1-9. In certain examples, the operations of method 1400 may be performed by the UE narrowband operation module, as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may receive a control signal 505 from a base station on resources of a first narrowband region, as described above with reference to FIGS. 2-5. In certain examples, the operation(s) of block 1405 may be performed by the UE control signal module 705 as described above with reference to FIG. 7.

At block 1410, the UE 115 may identify a second narrowband region based at least in part on the control signal, as described above with reference to FIGS. 2-5. In certain examples, the operation(s) of block 1410 may be performed by the UE narrowband identification module 710, as described above with reference to FIG. 7.

At block 1415, the UE 115 may communicate with the base station on resources of the second narrowband region, as described above with reference to FIGS. 2-5. In certain examples, the operation(s) of block 1415 may be performed by the UE narrowband communication module 715, as described above with reference to FIG. 7.

Figure 15:
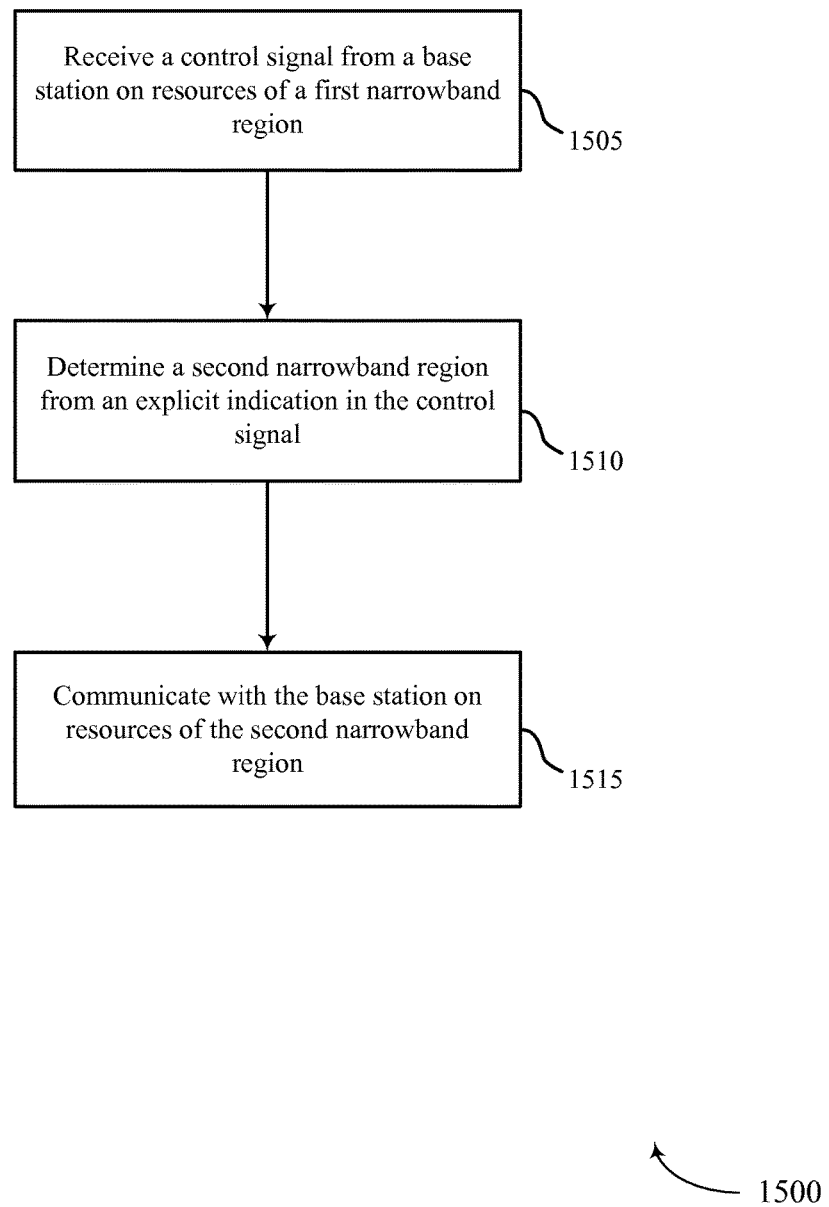
FIG. 15 shows a flowchart illustrating a method for linked narrowband operation for MTC in accordance with various aspects of the present disclosure.

FIG. 15 shows a flowchart illustrating a method 1500 for linked narrowband operation for MTC in accordance with various aspects of the present disclosure. The operations of method 1500 may be implemented by a UE 115 and its components as described with reference to FIGS. 1-9. In certain examples, the operations of method 1500 may be performed by the UE narrowband operation module 610, as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of method 1400 of FIG. 14.

At block 1505, the UE 115 may receive a control signal from a base station on resources of a first narrowband region, as described above with reference to FIGS. 2-5. In certain examples, the operation(s) of block 1505 may be performed by the UE control signal module 705, as described above with reference to FIG. 7.

At block 1510, the UE 115 may identify a second narrowband region based at least in part on the control signal, as described above with reference to FIGS. 2-5. For example, the UE 115 may determine the second narrowband region from an explicit indication in the control signal, as described above with reference to FIGS. 2-5. In certain examples, the operation(s) of block 1510 may be performed by the UE narrowband identification module 710, as described above with reference to FIG. 7.

At block 1515, the UE 115 may communicate with the base station on resources of the second narrowband region, as described above with reference to FIGS. 2-5. In certain examples, the operation(s) of block 1515 may be performed by the UE narrowband communication module 715, as described above with reference to FIG. 7.

Figure 16:
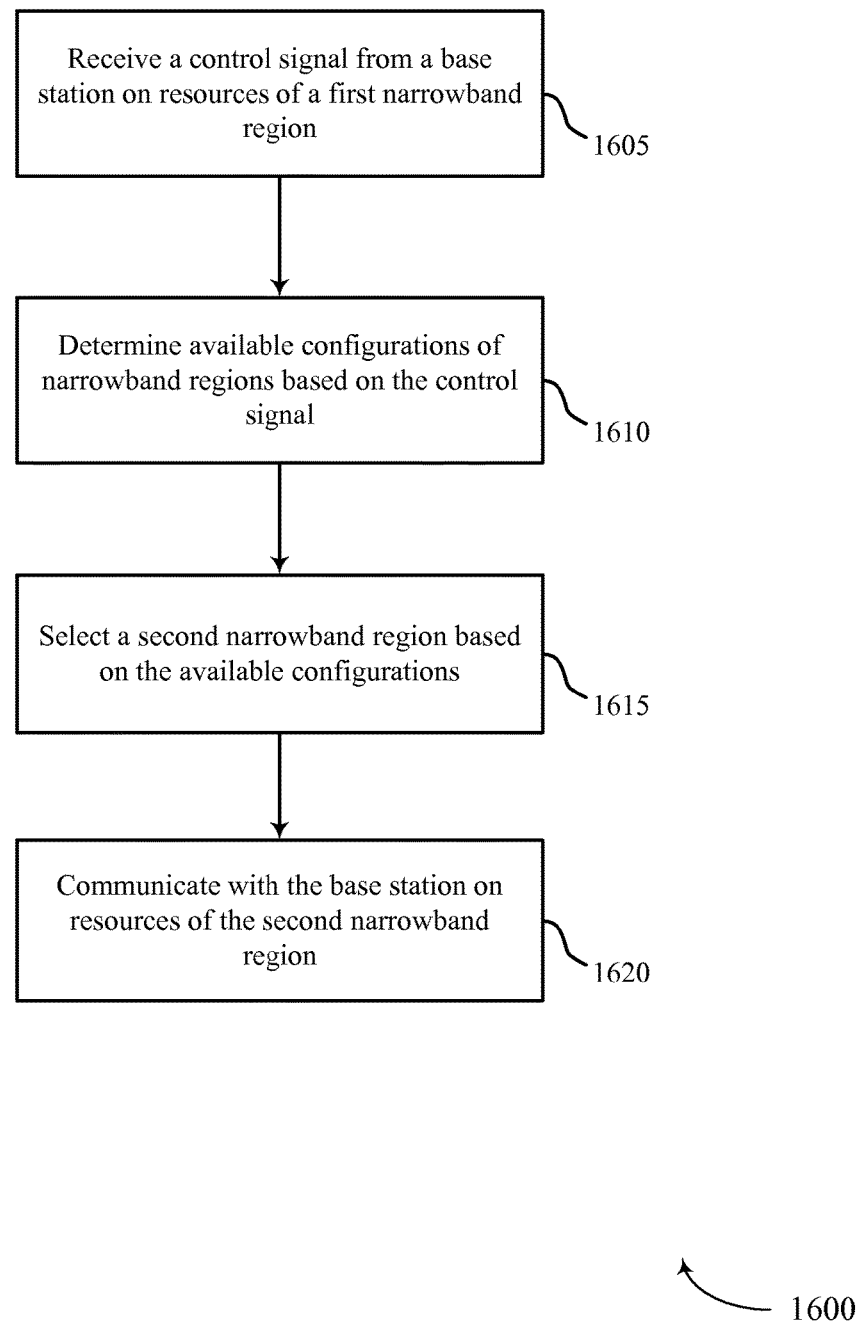
FIG. 16 shows a flowchart illustrating a method for linked narrowband operation for MTC in accordance with various aspects of the present disclosure.

FIG. 16 shows a flowchart illustrating a method 1600 for linked narrowband operation for MTC in accordance with various aspects of the present disclosure. The operations of method 1600 may be implemented by a UE 115 and its components, as described with reference to FIGS. 1-9. In certain examples, the operations of method 1600 may be performed by the UE narrowband operation module 610, as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1400 and 1500 of FIGS. 14 and 15.

At block 1605, the UE 115 may receive a control signal from a base station on resources of a first narrowband region, as described above with reference to FIGS. 2-5. In certain examples, the operation(s) of block 1605 may be performed by the UE control signal module 705, as described above with reference to FIG. 7.

At block 1610, the UE 115 may identify a second narrowband region based at least in part on the control signal, as described above with reference to FIGS. 2-5. For example, the UE 115 may determine a set of available configurations of narrowband regions based on the control signal, as described above with reference to FIGS. 2-5. In certain examples, the operation(s) of block 1610 may be performed by the UE narrowband identification module 710, as described above with reference to FIG. 7.

At block 1615, the UE 115 may select the second narrowband region based on the set of available configurations, as described above with reference to FIGS. 2-5. In certain examples, the operation(s) of block 1615 may be performed by the UE narrowband identification module 710, as described above with reference to FIG. 7.

At block 1620, the UE 115 may communicate with the base station on resources of the second narrowband region, as described above with reference to FIGS. 2-5. In certain examples, the operation(s) of block 1620 may be performed by the UE narrowband communication module 715, as described above with reference to FIG. 7.

Figure 17:
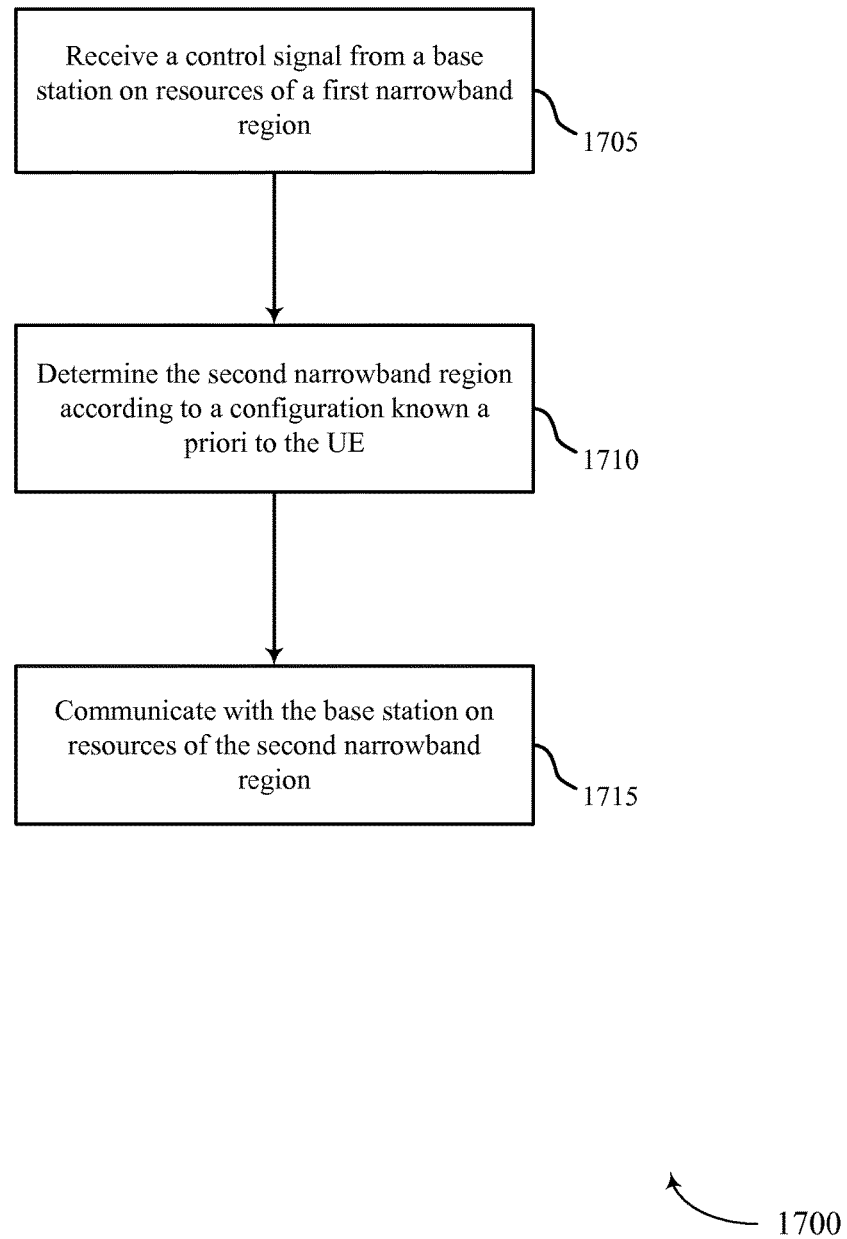
FIG. 17 shows a flowchart illustrating a method for linked narrowband operation for MTC in accordance with various aspects of the present disclosure.

FIG. 17 shows a flowchart illustrating a method 1700 for linked narrowband operation for MTC in accordance with various aspects of the present disclosure. The operations of method 1700 may be implemented by a UE 115 and its components, as described with reference to FIGS. 1-9. In certain examples, the operations of method 1700 may be performed by the UE narrowband operation module 610, as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1400, 1500, and 1600 of FIGS. 14-16.

At block 1705, the UE 115 may receive a control signal from a base station on resources of a first narrowband region, as described above with reference to FIGS. 2-5. In certain examples, the operation(s) of block 1705 may be performed by the UE control signal module 705, as described above with reference to FIG. 7.

At block 1710, the UE 115 may identify a second narrowband region 415-*b* based at least in part on the control signal, as described above with reference to FIGS. 2-5. For example, the UE 115 may determine the second narrowband region according to a configuration known a priori to the UE, as described above with reference to FIGS. 2-5. In certain examples, the operation(s) of block 1710 may be performed by the UE narrowband identification module 710, as described above with reference to FIG. 7.

At block 1715, the UE 115 may communicate with the base station on resources of the second narrowband region, as described above with reference to FIGS. 2-5. In certain examples, the operation(s) of block 1715 may be performed by the UE narrowband communication module 715, as described above with reference to FIG. 7.

Figure 18:
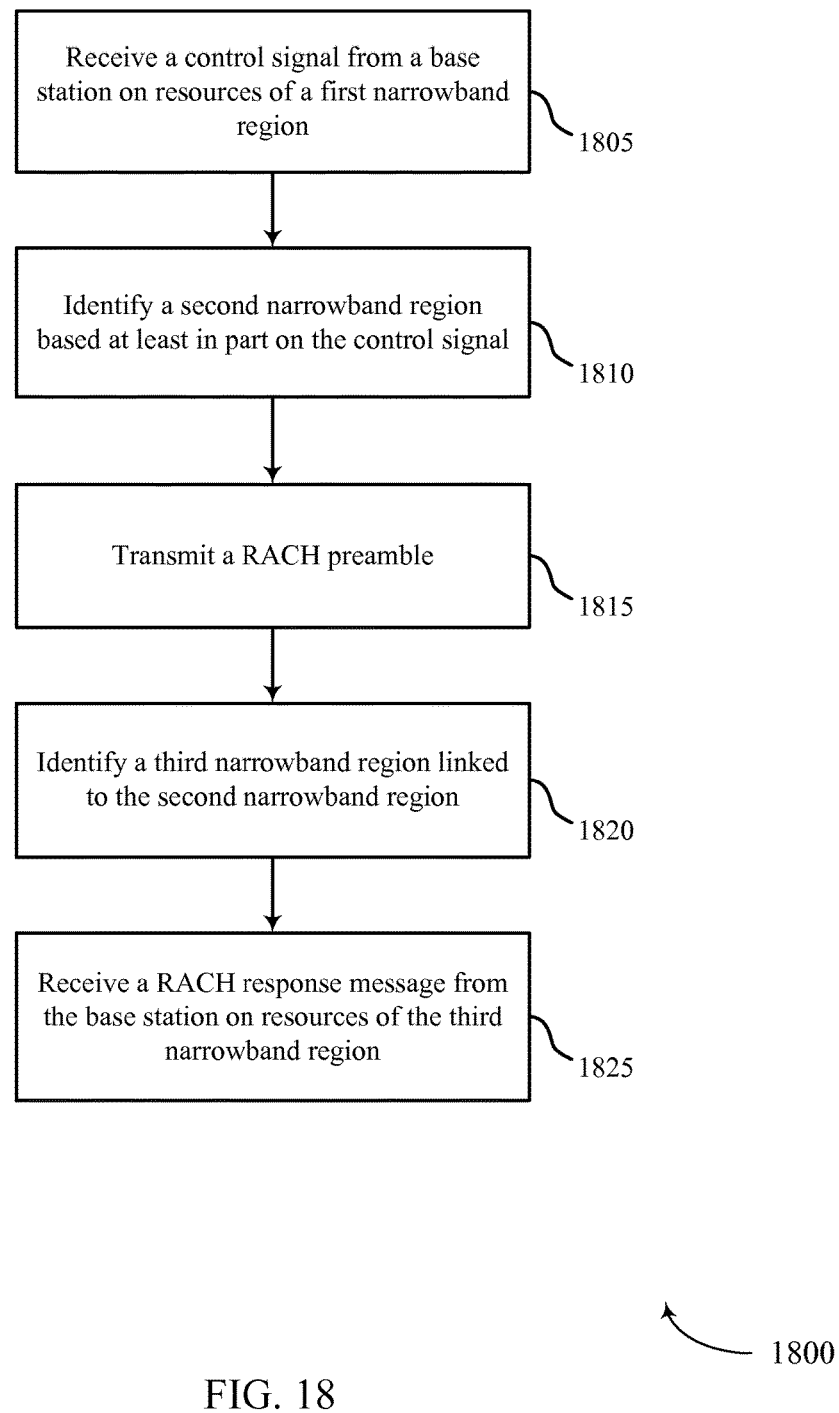
FIG. 18 shows a flowchart illustrating a method for linked narrowband operation for MTC in accordance with various aspects of the present disclosure.

FIG. 18 shows a flowchart illustrating a method 1800 for linked narrowband operation for MTC in accordance with various aspects of the present disclosure. The operations of method 1800 may be implemented by a UE 115 and its components as described with reference to FIGS. 1-9. In certain examples, the operations of method 1800 may be performed by the UE narrowband operation module 610, as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1400, 1500, 1600, and 1700 of FIGS. 14-17.

At block 1805, the UE 115 may receive a control signal from a base station on resources of a first narrowband region, as described above with reference to FIGS. 2-5. In certain examples, the operation(s) of block 1805 may be performed by the UE control signal module 705, as described above with reference to FIG. 7.

At block 1810, the UE 115 may identify a second narrowband region based at least in part on the control signal, as described above with reference to FIGS. 2-5. In certain examples, the operation(s) of block 1810 may be performed by the UE narrowband identification module 710, as described above with reference to FIG. 7.

At block 1815, the UE 115 may transmit a RACH preamble, as described above with reference to FIGS. 2-5. In certain examples, the operation(s) of block 1815 may be performed by the UE random access module 925, as described above with reference to FIG. 9.

At block 1820, the UE 115 may identify a third narrowband region linked to the second narrowband region, as described above with reference to FIGS. 2-5. In certain examples, the operation(s) of block 1820 may be performed by the UE narrowband identification module 710, as described above with reference to FIG. 7.

At block 1825, the UE 115 may receive a RACH response message from the base station on resources of the third narrowband region, as described above with reference to FIGS. 2-5. In certain examples, the operation(s) of block 1825 may be performed by the UE random access module 905, as described above with reference to FIG. 9.

Figure 19:
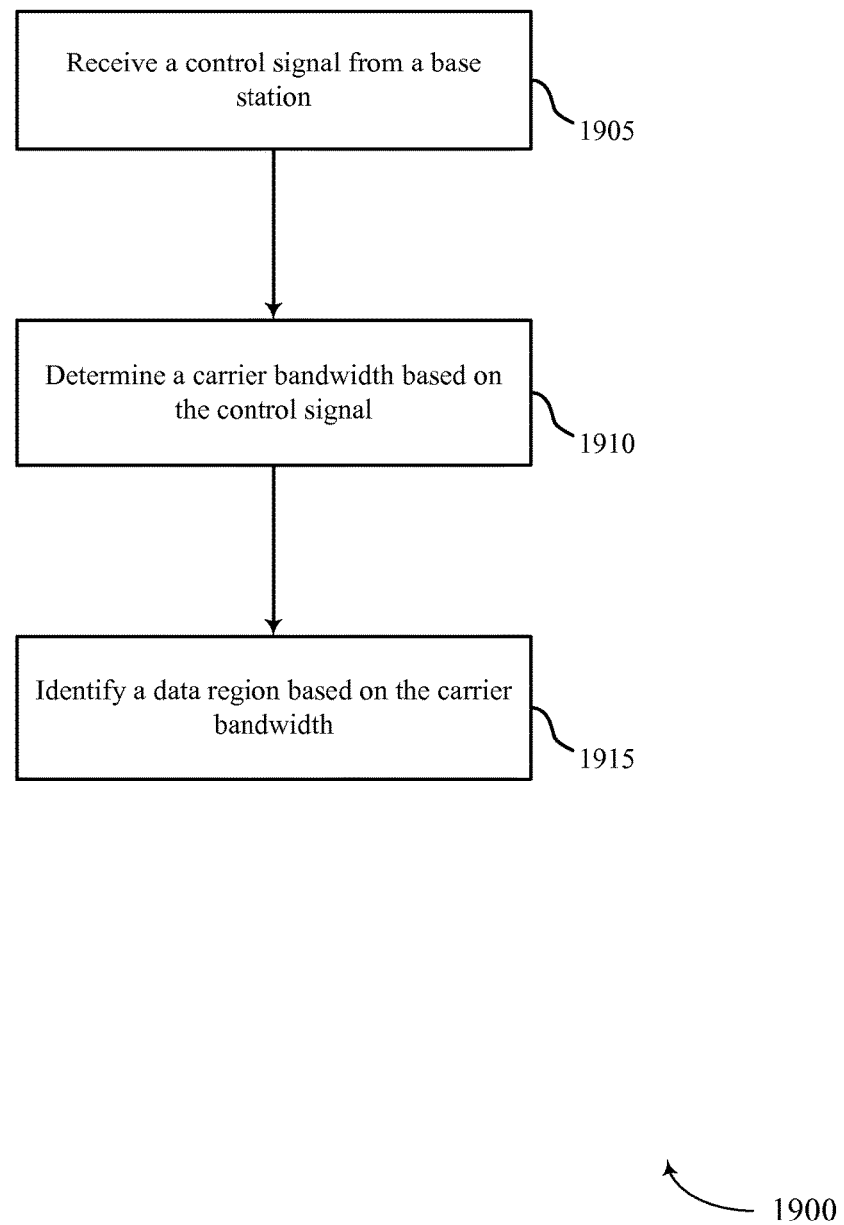
FIG. 19 shows a flowchart illustrating a method for linked narrowband operation for MTC in accordance with various aspects of the present disclosure.

FIG. 19 shows a flowchart illustrating a method 1900 for linked narrowband operation for MTC in accordance with various aspects of the present disclosure. The operations of method 1900 may be implemented by a UE 115 and its components as described with reference to FIGS. 1-9. In certain examples, the operations of method 1900 may be performed by the UE narrowband operation module 610, as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1400, 1500, 1600, 1700, and 1800 of FIGS. 14-18.

At block 1905, the UE 115 may receive a control signal 505 from a base station as described above with reference to FIGS. 2-5. In certain examples, the operation(s) of block 1905 may be performed by the UE control signal module 705, as described above with reference to FIG. 7.

At block 1910, the UE 115 may determine a carrier bandwidth based on the control signal, as described above with reference to FIG. 5. In certain examples, the operation(s) of block 1910 may be performed by the bandwidth determination module 810, as described above with reference to FIG. 8.

At block 1915, the UE 115 may identify a data region based on the carrier bandwidth, as described above with reference to FIG. 5. In certain examples, the operation(s) of block 1915 may be performed by the data region identification module 815 as described above with reference to FIG. 8.

Figure 20:
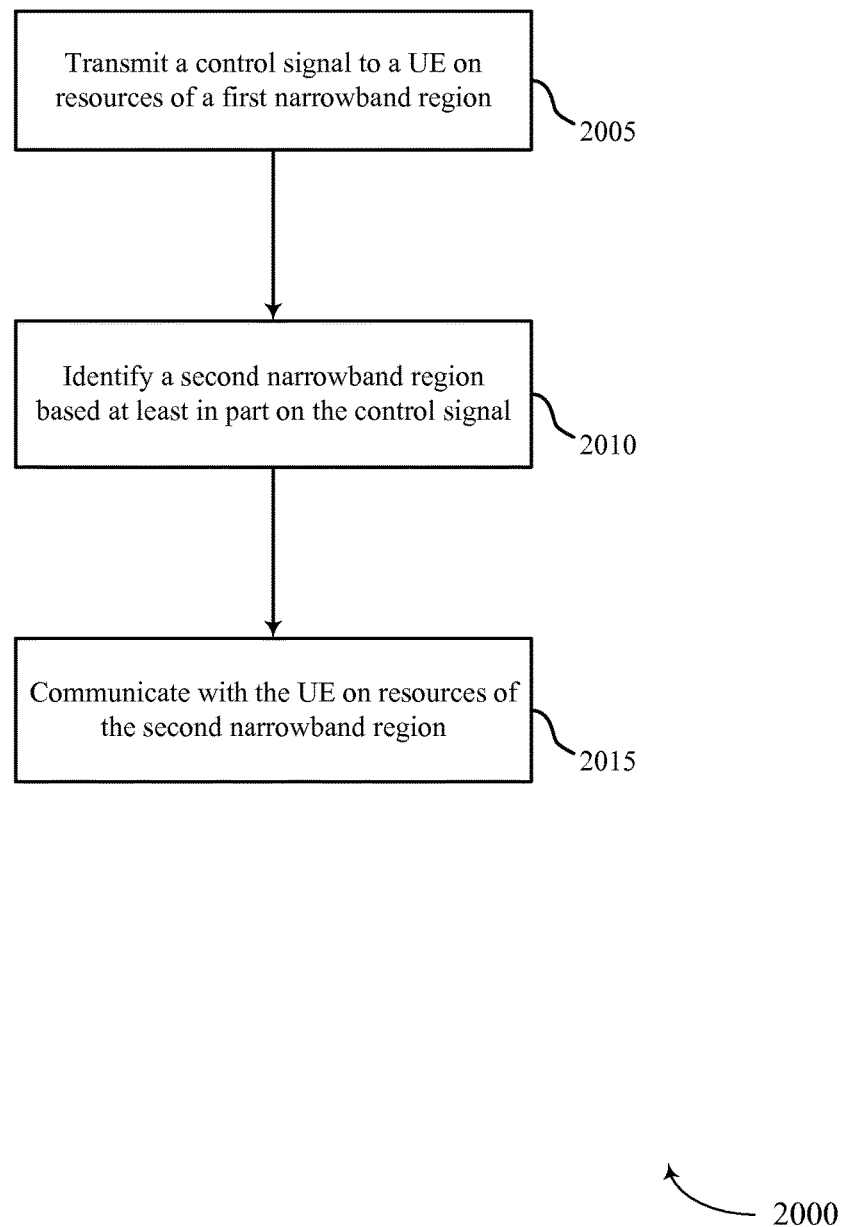
FIG. 20 shows a flowchart illustrating a method for linked narrowband operation for MTC in accordance with various aspects of the present disclosure.

FIG. 20 shows a flowchart illustrating a method 2000 for linked narrowband operation for MTC in accordance with various aspects of the present disclosure. The operations of method 2000 may be implemented by a base station 105 and its components as described with reference to FIGS. 1-5, and 10-13. In certain examples, the operations of method 2000 may be performed by the BS narrowband operation module 1010, as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware.

At block 2005, the base station 105 may transmit a control signal to a UE on resources of a first narrowband region, as described above with reference to FIGS. 2-5. In certain examples, the operation(s) of block 2005 may be performed by the BS control signal module 1105, as described above with reference to FIG. 10.

At block 2010, the base station 105 may identify a second narrowband region based at least in part on the control signal, as described above with reference to FIGS. 2-5. In certain examples, the operation(s) of block 2010 may be performed by the BS narrowband identification module 1110, as described above with reference to FIG. 10.

At block 2015, the base station 105 may communicate with the UE on resources of the second narrowband region, as described above with reference to FIGS. 2-5. In certain examples, the operation(s) of block 2015 may be performed by the BS narrowband communication module 1115, as described above with reference to FIG. 10.

Thus, methods 1400, 1500, 1600, 1700, 1800, 1900, and 2000 may provide for linked narrowband operation for MTC. It should be noted that methods 1400, 1500, 1600, 1700, 1800, 1900, and 2000 describe possible implementations, and that the operations and the steps may be rearranged or otherwise modified such that other implementations are possible. In some examples, aspects from two or more of the methods 1400, 1500, 1600, 1700, 1800, 1900, and 2000 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   receiving a control signal from a base station on resources of a first narrowband region;
   identifying a second narrowband region based at least in part on the control signal, wherein the first narrowband region is different from the second narrowband region; and
   transmitting a random access channel (RACH) preamble to the base station on resources of the second narrowband region.

2. The method of claim 1, further comprising:
   determining the second narrowband region from an explicit indication in the control signal.

3. The method of claim 1, further comprising:
   determining a set of available configurations of narrowband regions based on the control signal; and
   selecting the second narrowband region based on the set of available configurations.

4. The method of claim 1, further comprising:
   determining the second narrowband region according to a configuration known a priori to the UE.

5. The method of claim 1, further comprising:
   identifying a third narrowband region linked to the second narrowband region; and
   receiving a RACH response message from the base station on resources of the third narrowband region.

6. The method of claim 1, wherein the transmitting comprises:
   transmitting a connection request on resources of the second narrowband region.

7. The method of claim 6, further comprising:
   identifying a third narrowband region linked to the second narrowband region; and
   receiving a connection setup message on resources of the third narrowband region.

8. The method of claim 1, wherein the control signal comprises at least one of a synchronization signal, a physical broadcast channel (PBCH) transmission, a paging message, a physical downlink control channel (PDCCH), or a system information block (SIB), or any combination thereof.

9. The method of claim 1, wherein the control signal comprises a paging message.

10. The method of claim 1, further comprising:
    receiving a paging message on resources of a third narrowband region, wherein the control signal comprises at least one of a synchronization signal, a physical broadcast channel (PBCH) transmission, or a physical downlink control channel (PDCCH), or a system information block, (SIB), or any combination thereof.

11. The method of claim 10, further comprising:
    identifying the third narrowband region based on a group identity of the UE.

12. The method of claim 10, further comprising:
    identifying the third narrowband region based on the control signal.

13. The method of claim 10, further comprising:
    identifying the third narrowband region based on a configuration known a priori to the UE.

14. An apparatus for wireless communication at a user equipment (UE), comprising:
    a processor;
    memory in electronic communication with the processor; and
    instructions stored in the memory, wherein the instructions are executable by the processor to cause the apparatus to:
    receive a control signal from a base station on resources of a first narrowband region;
    identify a second narrowband region based at least in part on the control signal, wherein the first narrowband region is different from the second narrowband region; and
    transmit a random access channel (RACH) preamble to the base station on resources of the second narrowband region.

15. The apparatus of claim 14, wherein the instructions are executable by the processor to cause the apparatus to:
    determine the second narrowband region from an explicit indication in the control signal.

16. The apparatus of claim 14, wherein the instructions are executable by the processor to cause the apparatus to:
    determine a set of available configurations of narrowband regions based on the control signal; and
    select the second narrowband region based on the set of available configurations.

17. The apparatus of claim 14, wherein the instructions are executable by the processor to cause the apparatus to:
    determine the second narrowband region according to a configuration known a priori to the UE.

18. The apparatus of claim 14, wherein the instructions are executable by the processor to cause the apparatus to:
    identify a third narrowband region linked to the second narrowband region; and
    receive a RACH response message from the base station on resources of the third narrowband region.

19. The apparatus of claim 14, wherein the instructions are executable by the processor to cause the apparatus to:
    transmit a connection request on resources of the second narrowband region.

20. The apparatus of claim 19, wherein the instructions are executable by the processor to cause the apparatus to:
    identify a third narrowband region linked to the second narrowband region; and
    receive a connection setup message on resources of the third narrowband region.

21. The apparatus of claim 14, wherein the control signal comprises a synchronization signal, a physical broadcast channel (PBCH) transmission, a paging message, a physical downlink control channel (PDCCH), or a system information block (SIB), or any combination thereof.

22. The apparatus of claim 14, wherein:
    the control signal comprises a paging message.

23. The apparatus of claim 14, wherein the instructions are executable by the processor to cause the apparatus to:
    receive a paging message on resources of a third narrowband region, wherein the control signal comprises a synchronization signal, a physical broadcast channel (PBCH) transmission, a physical downlink control channel (PDCCH) or a system information block (SIB), or any combination thereof.

24. The apparatus of claim 23, wherein the instructions are executable by the processor to cause the apparatus to:
identify the third narrowband region based on a group identity of the UE.

25. The apparatus of claim 23, wherein the instructions are executable by the processor to cause the apparatus to:
identify the third narrowband region based on the control signal.

26. The apparatus of claim 23, wherein the instructions are executable by the processor to cause the apparatus to:
identify the third narrowband region based on a configuration known a priori to the UE.

27. An apparatus for wireless communication at a user equipment (UE), comprising:
means for receiving a control signal from a base station on resources of a first narrowband region;
means for identifying a second narrowband region based at least in part on the control signal, wherein the first narrowband region is different from the second narrowband region; and
means for transmitting a random access channel (RACH) preamble to the base station on resources of the second narrowband region.

28. A non-transitory computer-readable medium storing code for wireless communication at a user equipment (UE), the code comprising instructions executable by a processor to:
receive a control signal from a base station on resources of a first narrowband region;
identify a second narrowband region based at least in part on the control signal, wherein the first narrowband region is different from the second narrowband region; and
transmit a random access channel (RACH) preamble to the base station on resources of the second narrowband region.

* * * * *